US011532150B1

(12) United States Patent
Tohlen et al.

(10) Patent No.: US 11,532,150 B1
(45) Date of Patent: Dec. 20, 2022

(54) METHOD FOR DETERMINING A HISTOGRAM OF VARIABLE SAMPLE RATE WAVEFORMS

(71) Applicant: Honeywell Federal Manufacturing & Technologies, LLC, Kansas City, MO (US)

(72) Inventors: Michael Aaron Tohlen, Lee's Summit, MO (US); Mitchell Hedges Morrow, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 17/410,030

(22) Filed: Aug. 24, 2021

Related U.S. Application Data

(63) Continuation-in-part of application No. 16/889,909, filed on Jun. 2, 2020, now Pat. No. 11,100,689.

(51) Int. Cl.
*G06F 17/18* (2006.01)
*G06F 17/12* (2006.01)
*G06V 10/75* (2022.01)
*G06F 17/40* (2006.01)

(52) U.S. Cl.
CPC ............ *G06V 10/758* (2022.01); *G06F 17/12* (2013.01); *G06F 17/18* (2013.01); *G06F 17/40* (2013.01)

(58) Field of Classification Search
CPC .......... G06F 17/12; G06F 17/18; G06F 17/40; G06V 10/758; G06T 11/206
See application file for complete search history.

(56) References Cited

FOREIGN PATENT DOCUMENTS

| WO | WO-0034901 A2 * | 6/2000 | ............ G06F 17/18 |
| WO | WO-2016022998 A2 * | 2/2016 | ........... C12Q 1/6869 |

\* cited by examiner

*Primary Examiner* — Jeffery A Brier
(74) *Attorney, Agent, or Firm* — Hovey Williams LLP

(57) ABSTRACT

A computer-implemented method comprises receiving a plurality of sampled data points, each data point including a y value and a t value; defining a plurality of bins; defining an array of elements; dividing the sampled data points into a plurality of sections; assigning a plurality of polynomial equations, one polynomial equation to each section, each polynomial equation having a waveform that fits the data points of the associated section; determining a plurality of section bin times, one section bin time for each bin in each section, each section bin time determined using the polynomial equation and indicating an amount of time that the waveform has values in the range of one of the bins; and adding the section bin time for each bin in each section to the histogram data in the array element pointed to by the number of the bin.

20 Claims, 18 Drawing Sheets

| CUR POINT | NEXT POINT | START BIN | STOP BIN | BIN # | LINE # | LINE EQUATION SOLVED FOR T | IN TIME | OUT TIME | TIME | RESULTS [BIN#] |
|---|---|---|---|---|---|---|---|---|---|---|
| 1 | 2 | 2 | 9 | 2 | 1 | T = (1-0.8)/3.6 | | 0.06 | 0.06 - 0 = 0.06 | 0.06 |
| 1 | 2 | 2 | 9 | 3 | 1 | T = (1-0.8)/3.6 | 0.06 | | | 0.00 |
| 1 | 2 | 2 | 9 | 3 | 1 | T = (1.5-0.8)/3.6 | | 0.19 | 0.19 - 0.06 = 0.13 | 0.13 |
| 1 | 2 | 2 | 9 | 4 | 1 | T = (1.5-0.8)/3.6 | 0.19 | | | 0.00 |
| 1 | 2 | 2 | 9 | 4 | 1 | T = (2-0.8)/3.6 | | 0.33 | 0.33 - 0.19 = 0.14 | 0.14 |
| 1 | 2 | 2 | 9 | 5 | 1 | T = (2-0.8)/3.6 | 0.33 | | | 0.00 |
| 1 | 2 | 2 | 9 | 5 | 1 | T = (2.5-0.8)/3.6 | | 0.47 | 0.47 - 0.33 = 0.14 | 0.14 |
| 1 | 2 | 2 | 9 | 6 | 1 | T = (2.5-0.8)/3.6 | 0.47 | | | 0.00 |
| 1 | 2 | 2 | 9 | 6 | 1 | T = (3-0.8)/3.6 | | 0.61 | 0.61 - 0.47 = 0.14 | 0.14 |
| 1 | 2 | 2 | 9 | 7 | 1 | T = (3-0.8)/3.6 | 0.61 | | | 0.00 |
| 1 | 2 | 2 | 9 | 7 | 1 | T = (3.5-0.8)/3.6 | | 0.75 | 0.75 - 0.61 = 0.14 | 0.14 |
| 1 | 2 | 2 | 9 | 8 | 1 | T = (3.5-0.8)/3.6 | 0.75 | | | 0.00 |
| 1 | 2 | 2 | 9 | 8 | 1 | T = (4-0.8)/3.6 | | 0.89 | 0.89 - 0.75 = 0.14 | 0.14 |
| 1 | 2 | 2 | 9 | 9 | 1 | T = (4-0.8)/3.6 | 0.89 | | 1 - 0.89 = 0.11 | 0.11 |
| 2 | 3 | 9 | 11 | 9 | 2 | T = (4.5-3.6)/0.8 | | 1.13 | 1.13 - 1 = 0.13 | 0.24 |
| 2 | 3 | 9 | 11 | 10 | 2 | T = (4.5-3.6)/0.8 | 1.13 | | | 0.00 |
| 2 | 3 | 9 | 11 | 10 | 2 | T = (5-3.6)/0.8 | | 1.75 | 1.75 - 1.13 = 0.62 | 0.62 |
| 2 | 3 | 9 | 11 | 11 | 2 | T = (5-3.6)/0.8 | 1.75 | | 2 - 1.75 = 0.25 | 0.25 |
| 3 | 4 | 11 | 7 | 11 | 3 | T = (5-9)/-1.9 | | 2.11 | 2.11 - 2 = 0.11 | 0.36 |
| 3 | 4 | 11 | 7 | 10 | 3 | T = (5-9)/-1.9 | 2.11 | | | 0.62 |
| 3 | 4 | 11 | 7 | 10 | 3 | T = (4.5-9)/-1.9 | | 2.37 | 2.37 - 2.11 = 0.26 | 0.88 |
| 3 | 4 | 11 | 7 | 9 | 3 | T = (4.5-9)/-1.9 | 2.37 | | | 0.24 |
| 3 | 4 | 11 | 7 | 9 | 3 | T = (4-9)/-1.9 | | 2.63 | 2.63 - 2.37 = 0.26 | 0.52 |
| 3 | 4 | 11 | 7 | 8 | 3 | T = (4-9)/-1.9 | 2.63 | | | 0.14 |
| 3 | 4 | 11 | 7 | 8 | 3 | T = (3.5-9)/-1.9 | | 2.89 | 2.89 - 2.63 = 0.26 | 0.40 |
| 3 | 4 | 11 | 7 | 7 | 3 | T = (3.5-9)/-1.9 | 2.89 | | 3 - 2.89 = 0.11 | 0.25 |

Fig. 5

| | CURRENT INVENTIVE HISTOGRAM | PRIOR ART HISTOGRAM |
|---|---|---|
| RESULTS[1] = | 0 | 0 |
| RESULTS[2] = | 0.06 | 1 |
| RESULTS[3] = | 0.13 | 0 |
| RESULTS[4] = | 0.14 | 0 |
| RESULTS[5] = | 0.14 | 0 |
| RESULTS[6] = | 0.14 | 0 |
| RESULTS[7] = | 1.02 | 2 |
| RESULTS[8] = | 1.18 | 1 |
| RESULTS[9] = | 1.34 | 2 |
| RESULTS[10] = | 2.14 | 0 |
| RESULTS[11] = | 2.36 | 3 |
| RESULTS[12] = | 1.34 | 2 |
| RESULTS[13] = | 0 | 0 |

Fig. 6

| SECTION | BIN # | BIN BOUNDARY VALUES (Y) | TIME 1 (T) | TIME 2 (T) |
|---|---|---|---|---|
| 1 | 38 | -3.52<br>-3.48 | -1<br>-0.995 | |
| 1 | 39 | -3.48<br>-3.44 | -0.995<br>-0.99 | |
| 1 | 40 | -3.44<br>-3.4 | -0.99<br>-0.985 | |
| 1 | 41 | -3.4<br>-3.36 | -0.985<br>-0.98 | |

⋮

| | | | | |
|---|---|---|---|---|
| 1 | 53 | -2.92<br>-2.88 | -0.925<br>-0.92 | 0<br>-0.01 |
| 1 | 54 | -2.88<br>-2.84 | -0.92<br>-0.915 | -0.01<br>-0.015 |
| 1 | 55 | -2.84<br>-2.8 | -0.915<br>-0.91 | -0.015<br>-0.03 |
| 1 | 56 | -2.8<br>-2.76 | -0.91<br>-0.905 | -0.03<br>-0.045 |

⋮

| | | | | |
|---|---|---|---|---|
| 1 | 75 | -2.04<br>-2 | -0.69<br>-0.68 | -0.37<br>-0.4 |
| 1 | 76 | -2<br>-1.96 | -0.68<br>-0.63 | -0.4<br>-0.43 |
| 1 | 77 | -1.96<br>-1.92 | -0.63<br>-0.62 | -0.43<br>-0.46 |
| 1 | 78 | -1.92<br>-1.88 | -0.62 | -0.46 |

Fig.14A

| SECTION | BIN # | BIN BOUNDARY VALUES (Y) | TIME (T) |
|---|---|---|---|
| 1 | 38 | -3.52<br>-3.48 | -1<br>-0.995 |
| 1 | 39 | -3.48<br>-3.44 | -0.995<br>-0.99 |
| 1 | 40 | -3.44<br>-3.4 | -0.99<br>-0.985 |
| 1 | 41 | -3.4<br>-3.36 | -0.985<br>-0.98 |

⋮

| | | | |
|---|---|---|---|
| 1 | 53 | -2.92<br>-2.88<br>-2.88<br>-2.92 | -0.925<br>-0.92<br>-0.01<br>0 |
| 1 | 54 | -2.88<br>-2.84<br>-2.84<br>-2.88 | -0.92<br>-0.915<br>-0.015<br>-0.01 |
| 1 | 55 | -2.84<br>-2.8<br>-2.8<br>-2.84 | -0.915<br>-0.91<br>-0.03<br>-0.015 |
| 1 | 56 | -2.8<br>-2.76<br>-2.76<br>-2.8 | -0.91<br>-0.905<br>-0.045<br>-0.03 |

Fig.14B

| SECTION | BIN # | BIN BOUNDARY VALUES (Y) | TIME (T) |
|---|---|---|---|
| 1 | 75 | -2.04 | -0.69 |
|   |    | -2    | -0.68 |
|   |    | -2    | -0.4  |
|   |    | -2.04 | -0.37 |
| 1 | 76 | -2    | -0.68 |
|   |    | -1.96 | -0.63 |
|   |    | -1.96 | -0.43 |
|   |    | -2    | -0.4  |
| 1 | 77 | -1.96 | -0.63 |
|   |    | -1.92 | -0.62 |
|   |    | -1.92 | -0.46 |
|   |    | -1.96 | -0.43 |
| 1 | 78 | -1.92 | -0.62 |
|   |    | -1.92 | -0.46 |

Fig.14C

METHOD FOR DETERMINING A HISTOGRAM OF VARIABLE SAMPLE RATE WAVEFORMS

RELATED APPLICATION

The current patent application is a continuation-in-part patent application which claims priority benefit, with regard to all common subject matter, to U.S. patent application Ser. No. 16/889,909, entitled "METHOD FOR DETERMINING A HISTOGRAM OF VARIABLE SAMPLE RATE WAVEFORMS", and filed Jun. 2, 2020. The earlier-filed patent application is hereby incorporated by reference in its entirety into the current application.

STATEMENT REGARDING FEDERALLY-SPONSORED RESEARCH OR DEVELOPMENT

This invention was made with Government support under Contract No.: DE-NA00002839 awarded by the United States Department of Energy/National Nuclear Security Administration. The Government has certain rights in the invention.

FIELD OF THE INVENTION

Embodiments of the current invention relate to computing devices and methods of generating histogram data for sampled data points of a waveform of a signal.

DESCRIPTION OF THE RELATED ART

A histogram is a representation of a distribution of data that occurs in a sampled waveform of a signal or a sampled population. The histogram includes a plurality of "bins", or array elements, wherein each bin includes data which represents a number of times that the sampled data had a particular value or range of values. The histogram data is typically collected by simply counting the number of times the sampled data had the value or range of values. While this approach works well with discrete, sampled population data, with sampled data from continuous waveforms, it does not account for the values the waveform has for the time in between the sampled data points. The approach is an approximation of the histogram data when calculated by simply counting the number of times the sampled data had the value or range of values. The approach may result in significant inaccuracy of the histogram data depending on the underlying waveform characteristics and bin sizes or boundary values—especially with respect to analog to digital converter quantization levels.

SUMMARY OF THE INVENTION

Embodiments of the current invention solve the above-mentioned problems and provide computing devices and methods that generate histogram data which accounts for the values the waveform has for the time in between the sampled data points. The embodiments generate a line between each pair of consecutive sampled data points and then apply interpolation techniques, such as a linear interpolation, to determine an amount of time that the line has value in each of the bins that lie along the path of the line. The time is accumulated for each bin and for each line. The histogram data is the accumulated time for each bin.

A method for generating histogram data for a plurality of sampled data points broadly comprises: receiving a plurality of sampled data points, each data point including a y (amplitude) value and a t (time) value; defining an array of bins, each bin identified by a unique number and including histogram data for a range of y values; for each consecutive pair of data points including a current data point and a next data point, determining a corresponding one of a plurality of linear equations, each linear equation defining a line between the current data point and the next data point; for each line, determining an amount of time that the y value of the line is within the range of values for each bin from the current data point to the next data point; and adding the time to the histogram data for each bin.

Another embodiment of the current invention provides a method for generating histogram data for a plurality of sampled data points broadly comprising: receiving a plurality of sampled data points, each data point including a y value and a t value; defining an array of bins, each bin identified by a unique number and including histogram data for a range of y values; for each consecutive pair of data points including a current data point and a next data point, performing the following steps: determining a linear equation for a line between the current data point and the next data point; determining a startbin including a bin number for the current data point and a stopbin including a bin number for the next data point; for each consecutive bin from the startbin to the stopbin, performing the following steps: determining an intime for when the line enters a range of the bin and an outtime for when the line exits the range of the bin; determining a total time equaling the outtime minus the intime; and adding the total time to the histogram data of the bin.

Another embodiment of the current invention provides a computing device for generating histogram data for a plurality of sampled data points broadly comprising a memory element and a processing element. The memory element is configured to store sampled data points, each data point including a y value and a t value. The processing element is in electronic communication with the memory element and is configured to receive a plurality of sampled data points, define an array of bins, each bin identified by a unique number and including histogram data for a range of y values, for each consecutive pair of data points including a current data point and a next data point, perform the following steps: determine a linear equation for a line between the current data point and the next data point, determine a startbin including a bin number for the current data point and a stopbin including a bin number for the next data point, for each consecutive bin from the startbin to the stopbin, perform the following steps: determine an intime for when the line enters a range of the bin and an outtime for when the line exits the range of the bin, determine a total time equaling the outtime minus the intime, and add the total time to the histogram data of the bin.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 2:
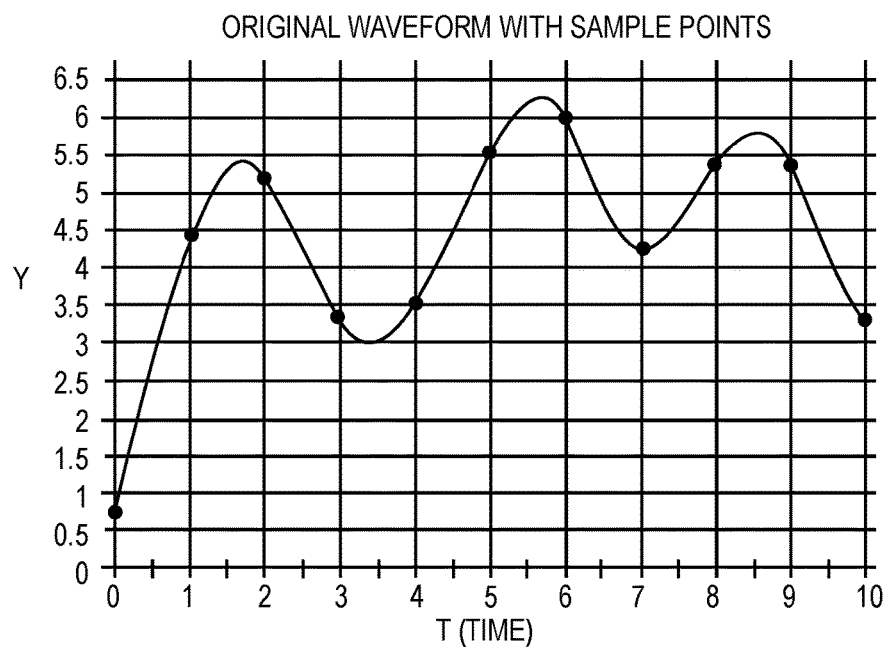
FIG. 2 is a plot of y vs. time for a waveform with a plurality of sampled data points.
Figure 3A:
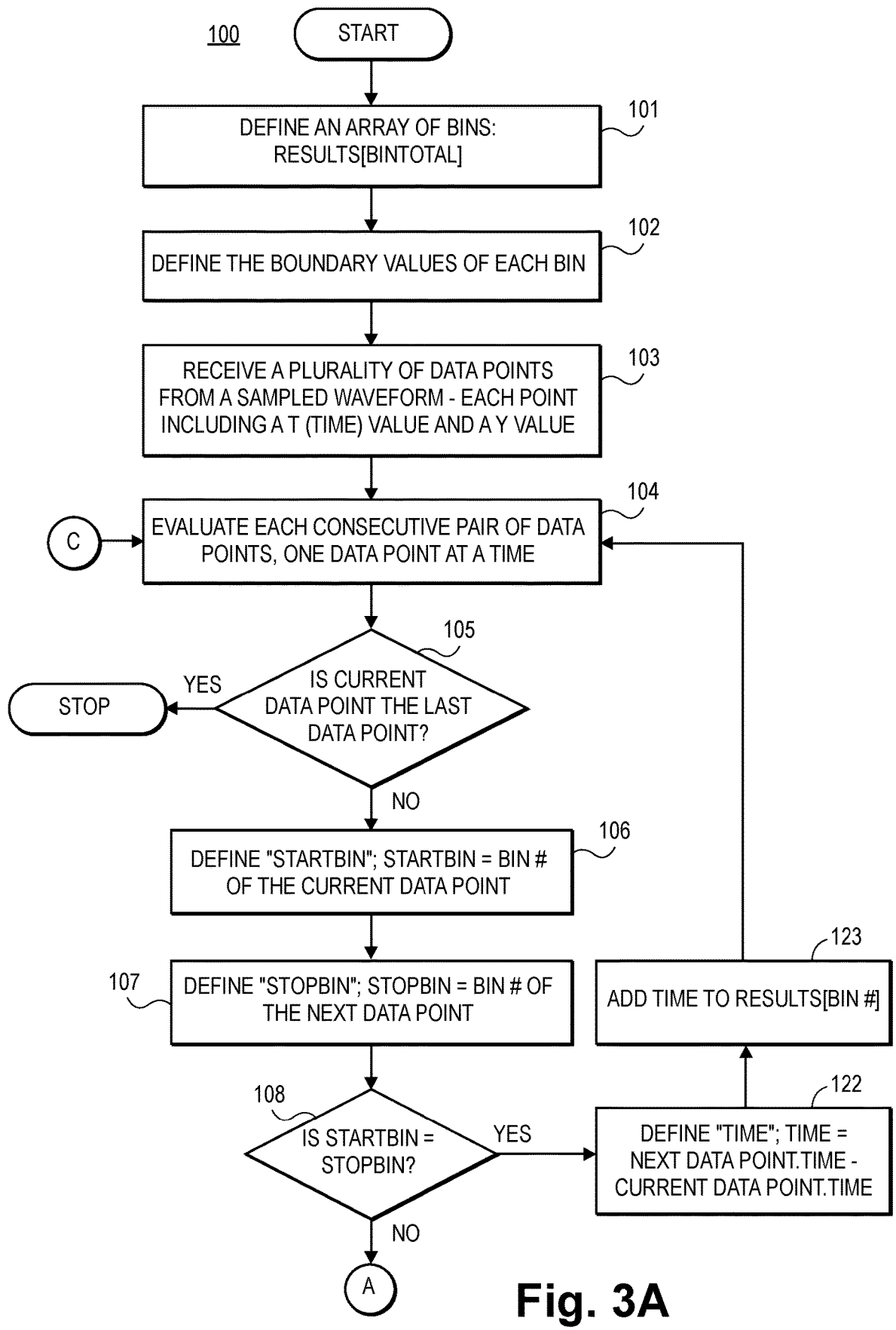
Figure 3B:
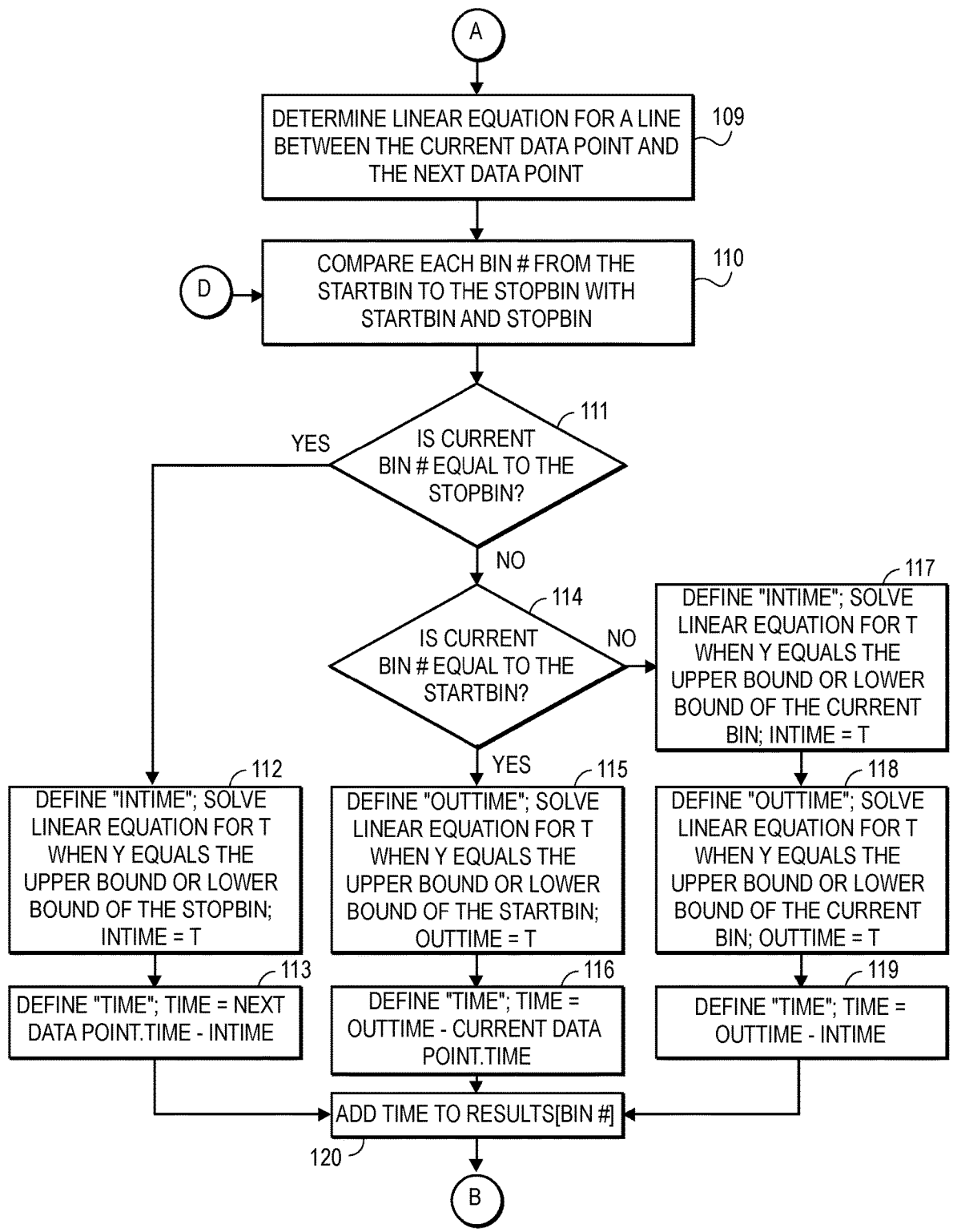
Figure 3C:
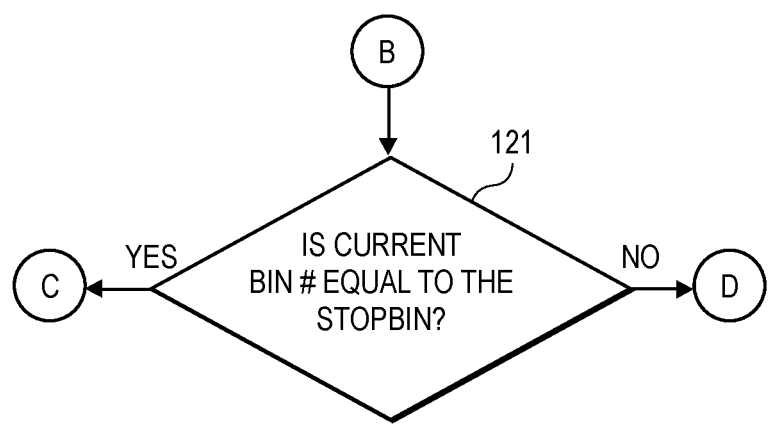
Figure 4:
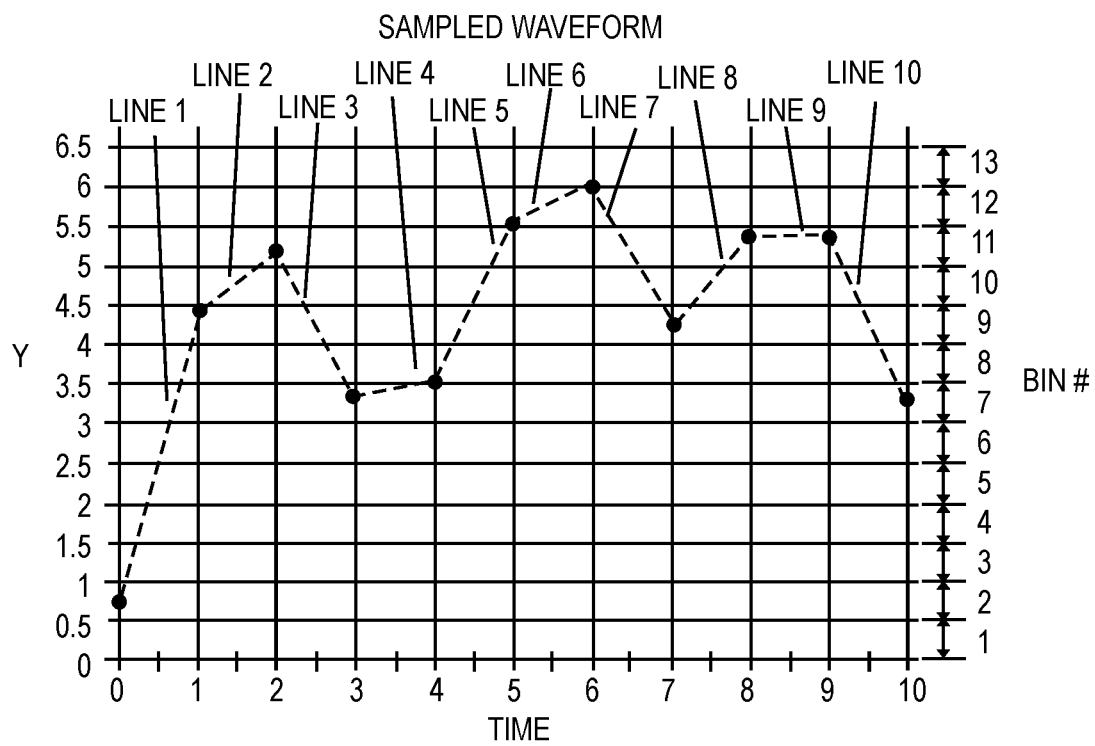
Figure 7:
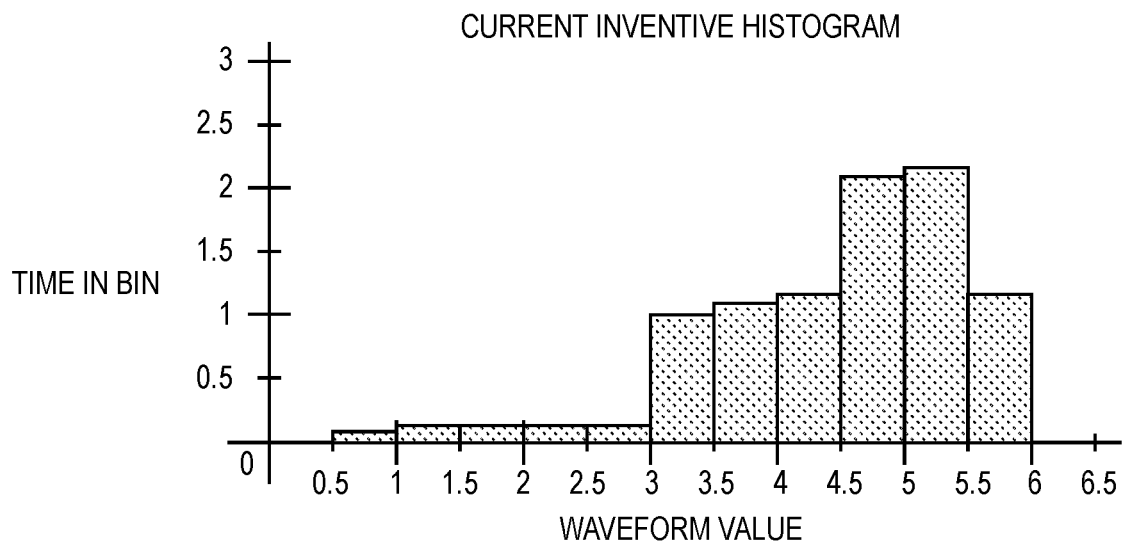
Figure 8:
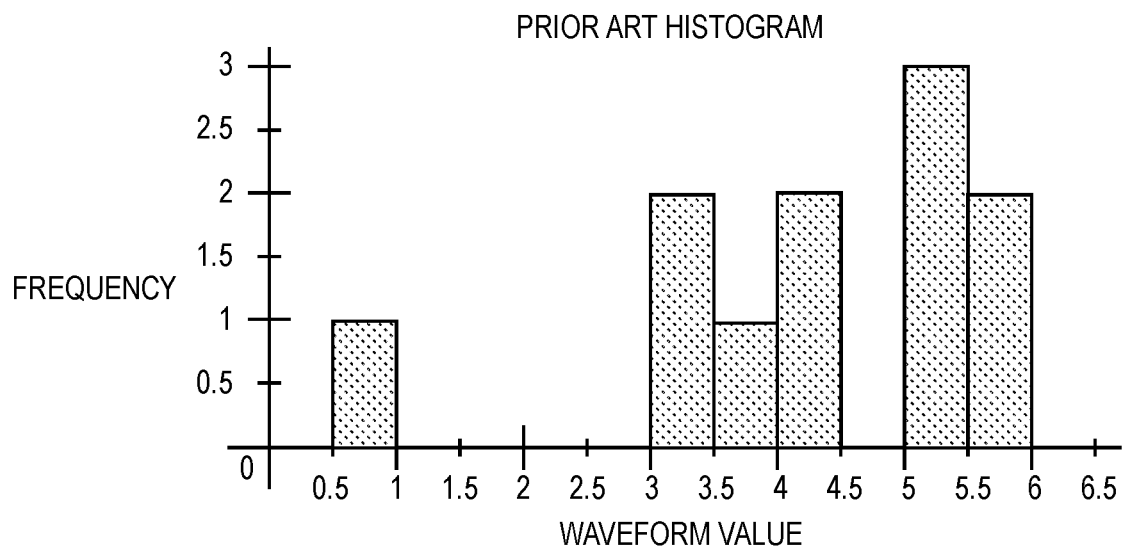
Figure 9:
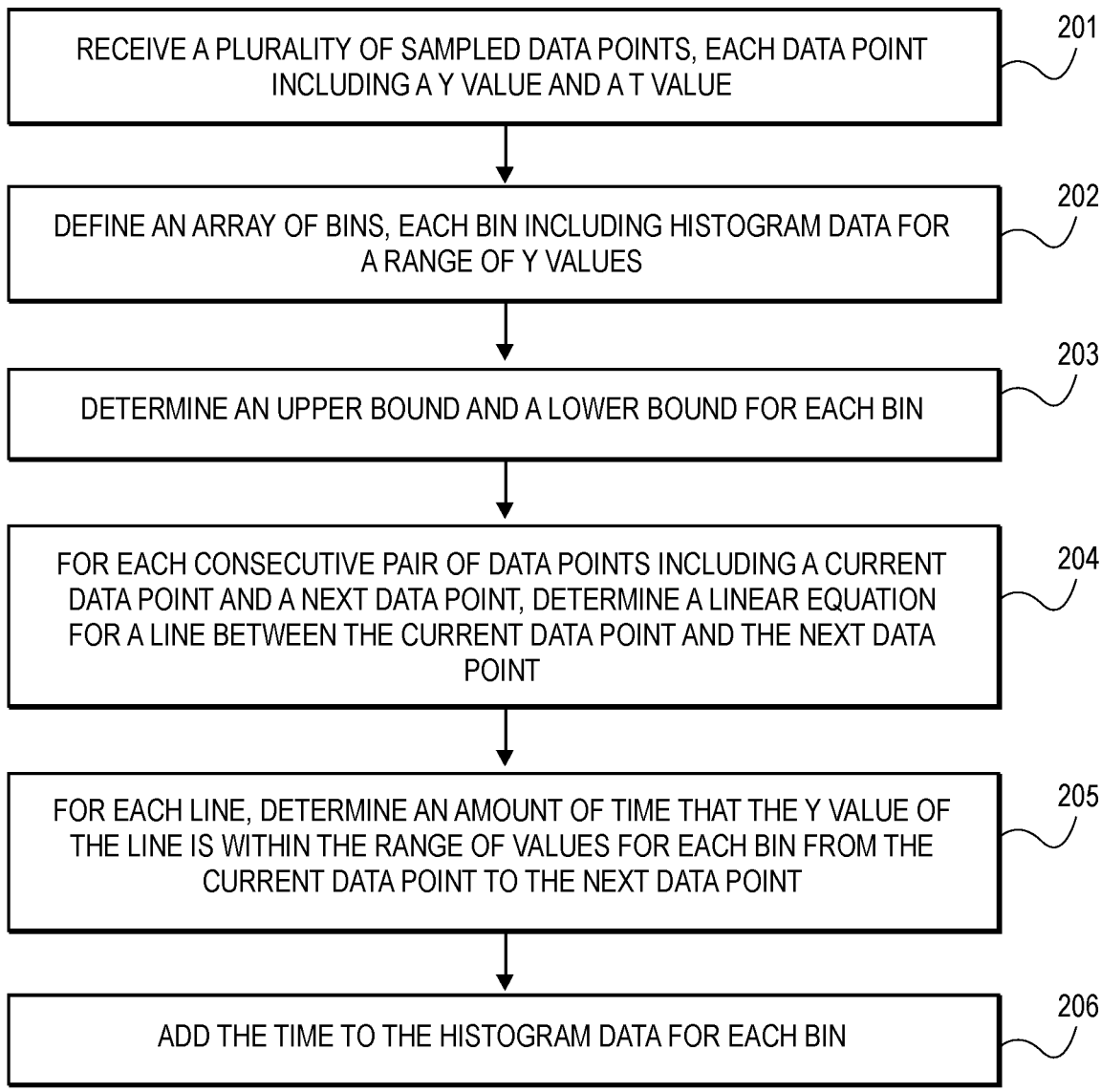
Figure 10:
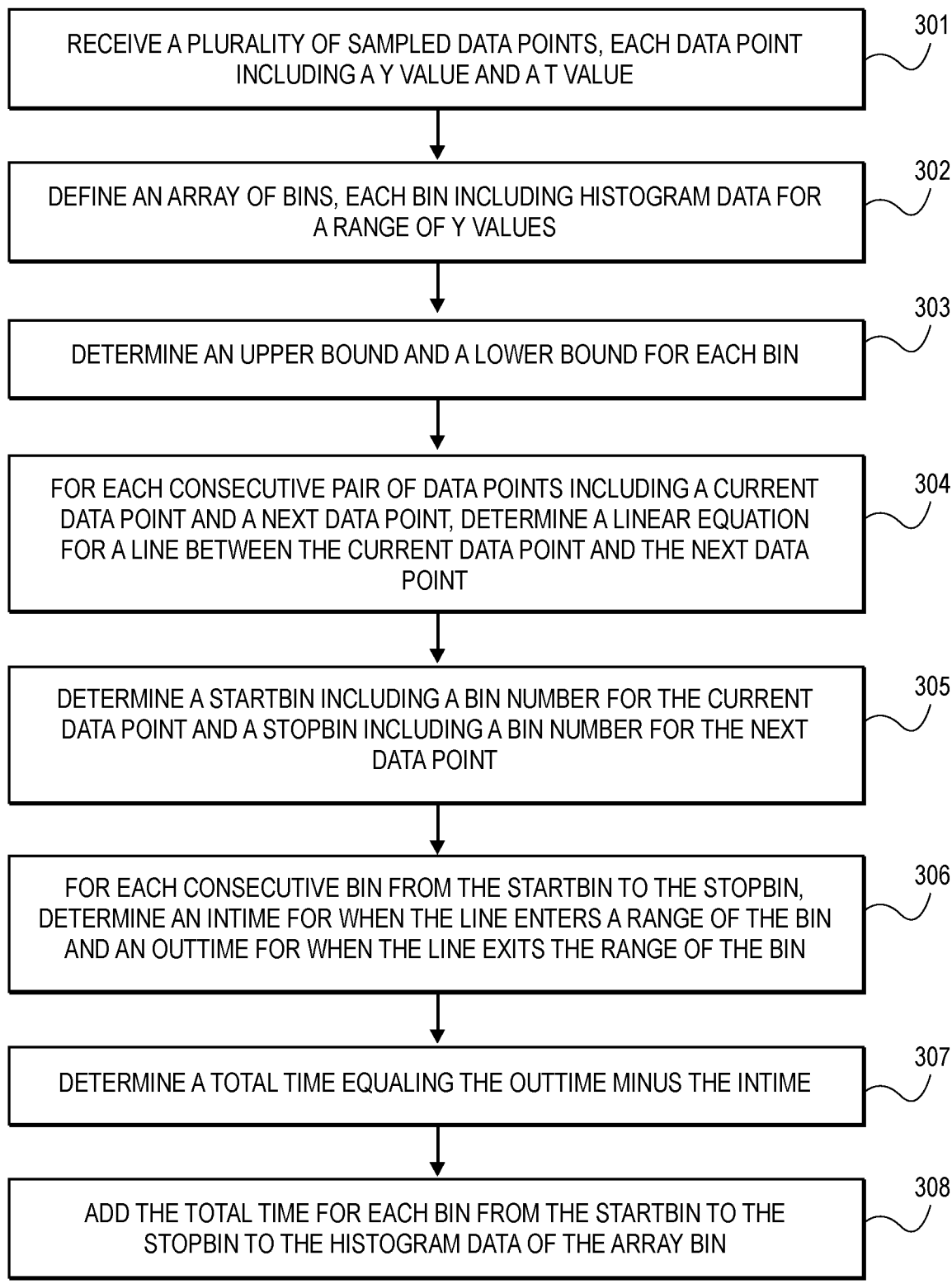
Figure 11A:
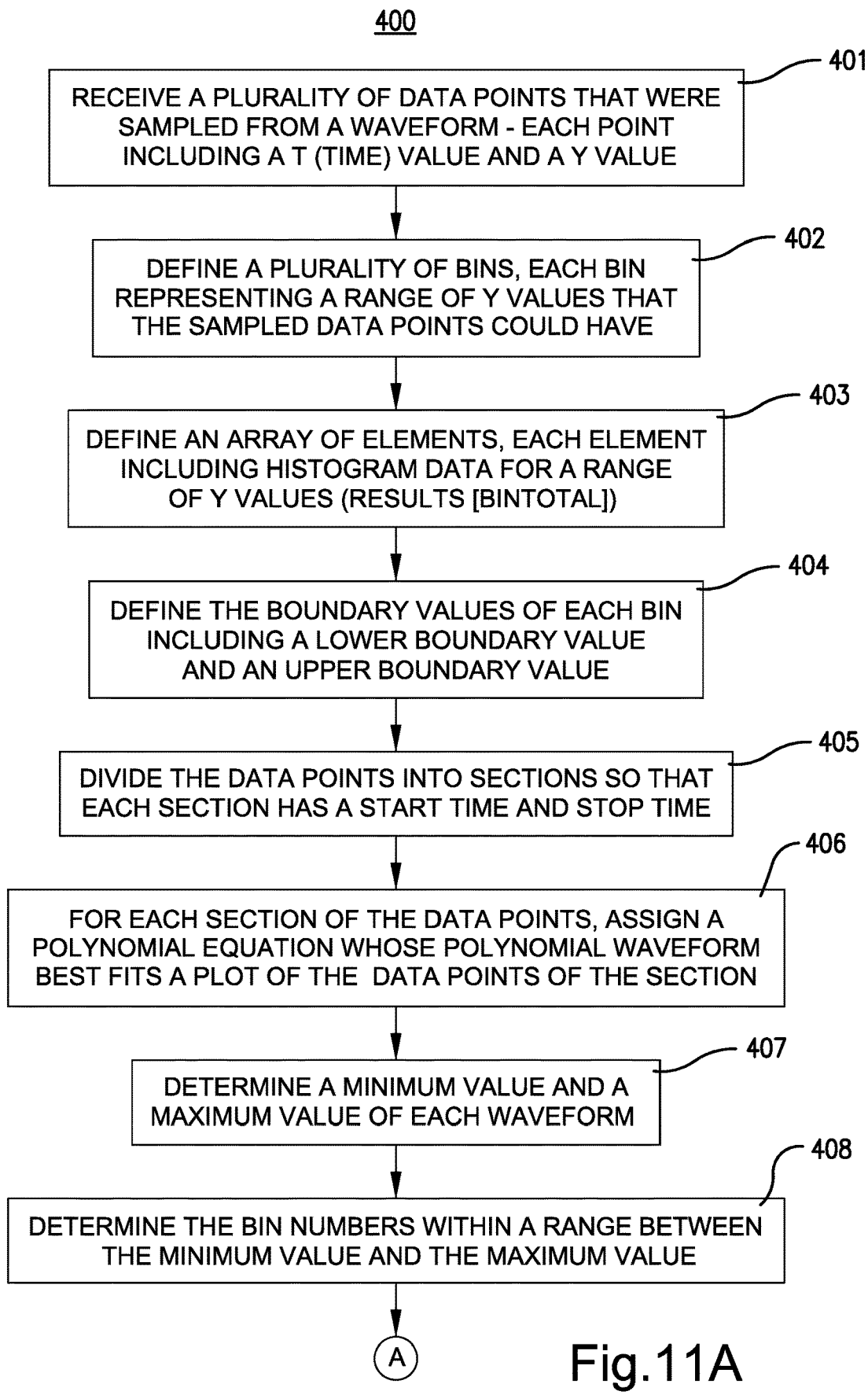
Figure 11B:
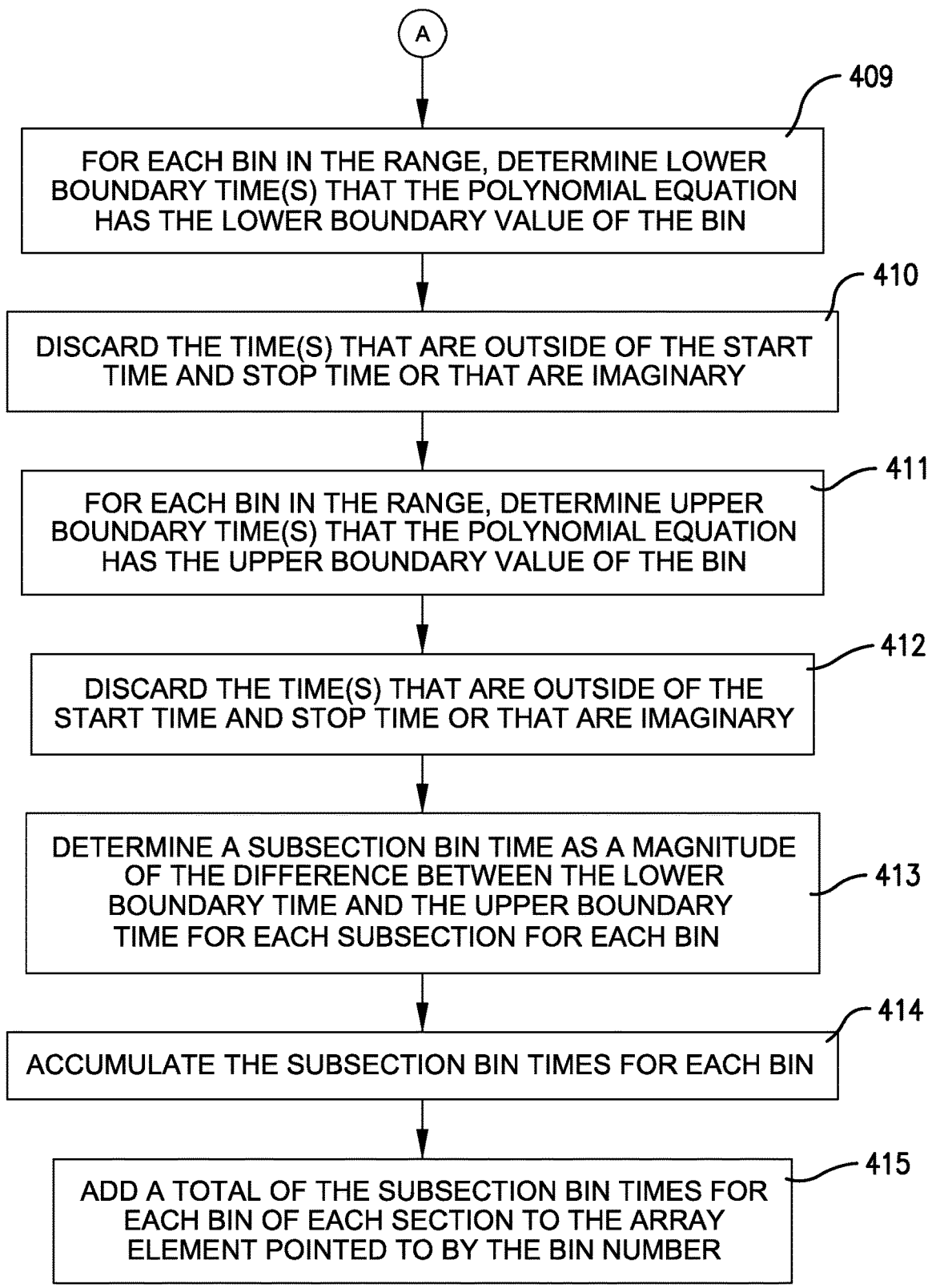
Figure 12:
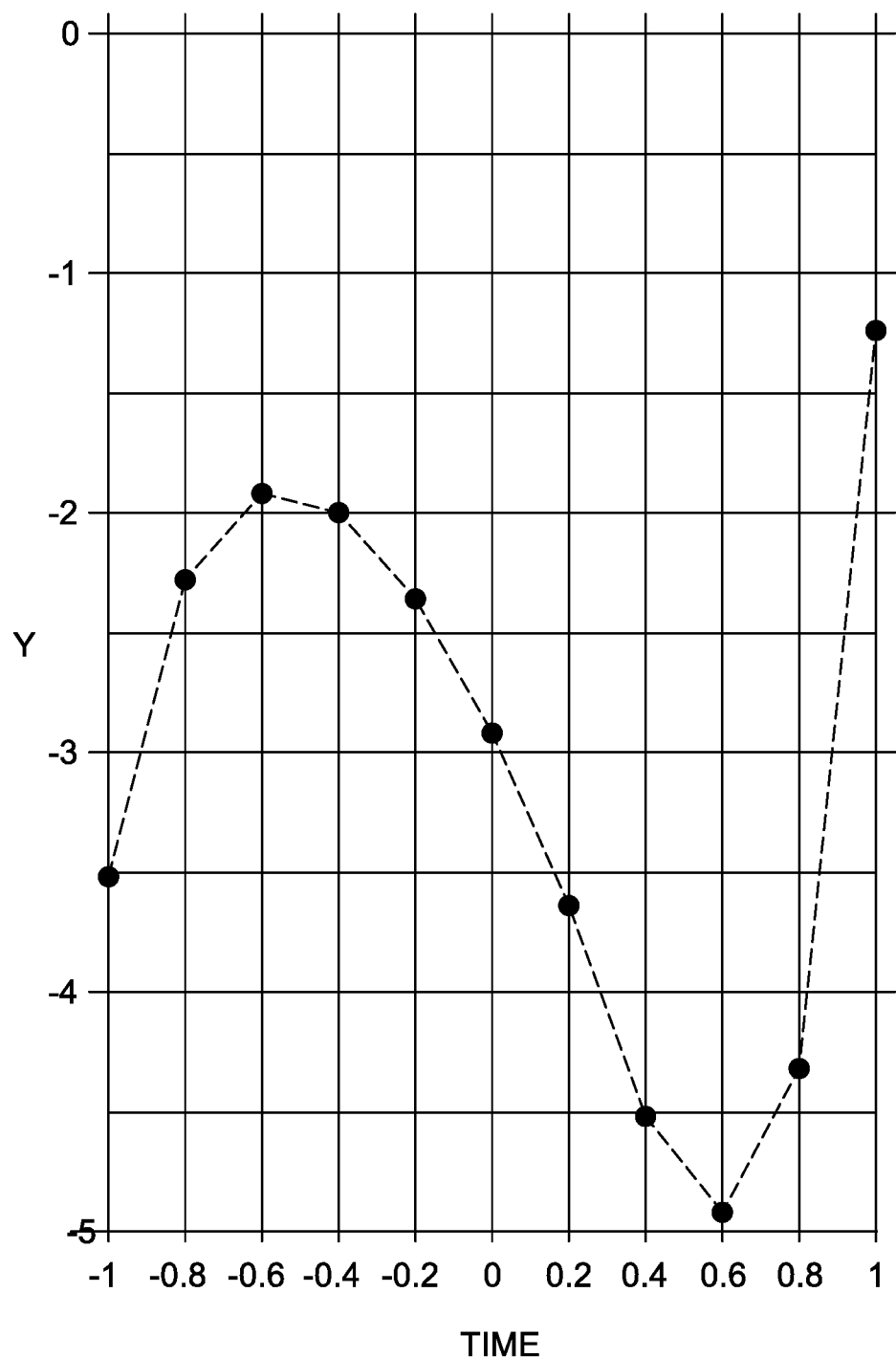
Figure 13A:
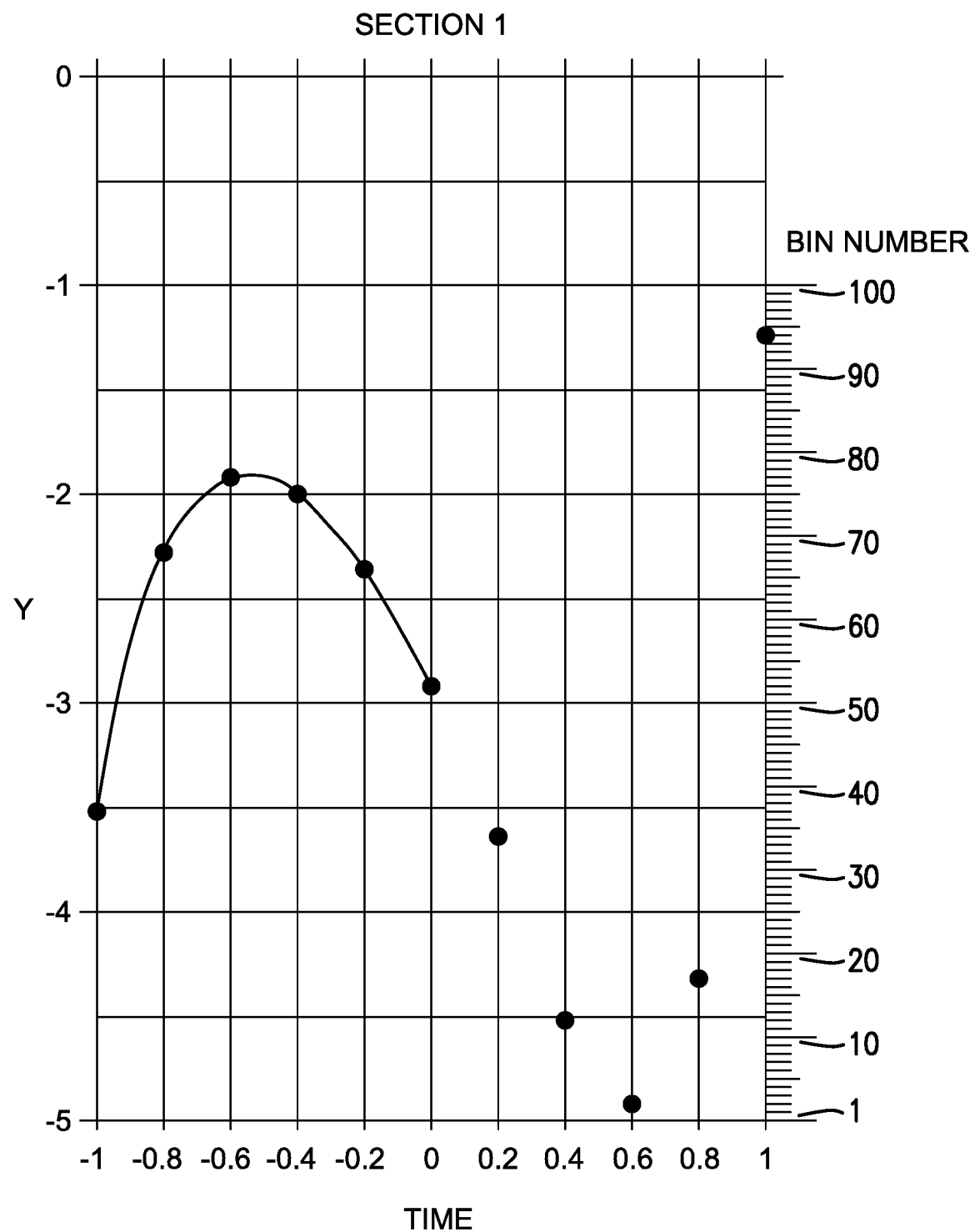
Figure 13B:
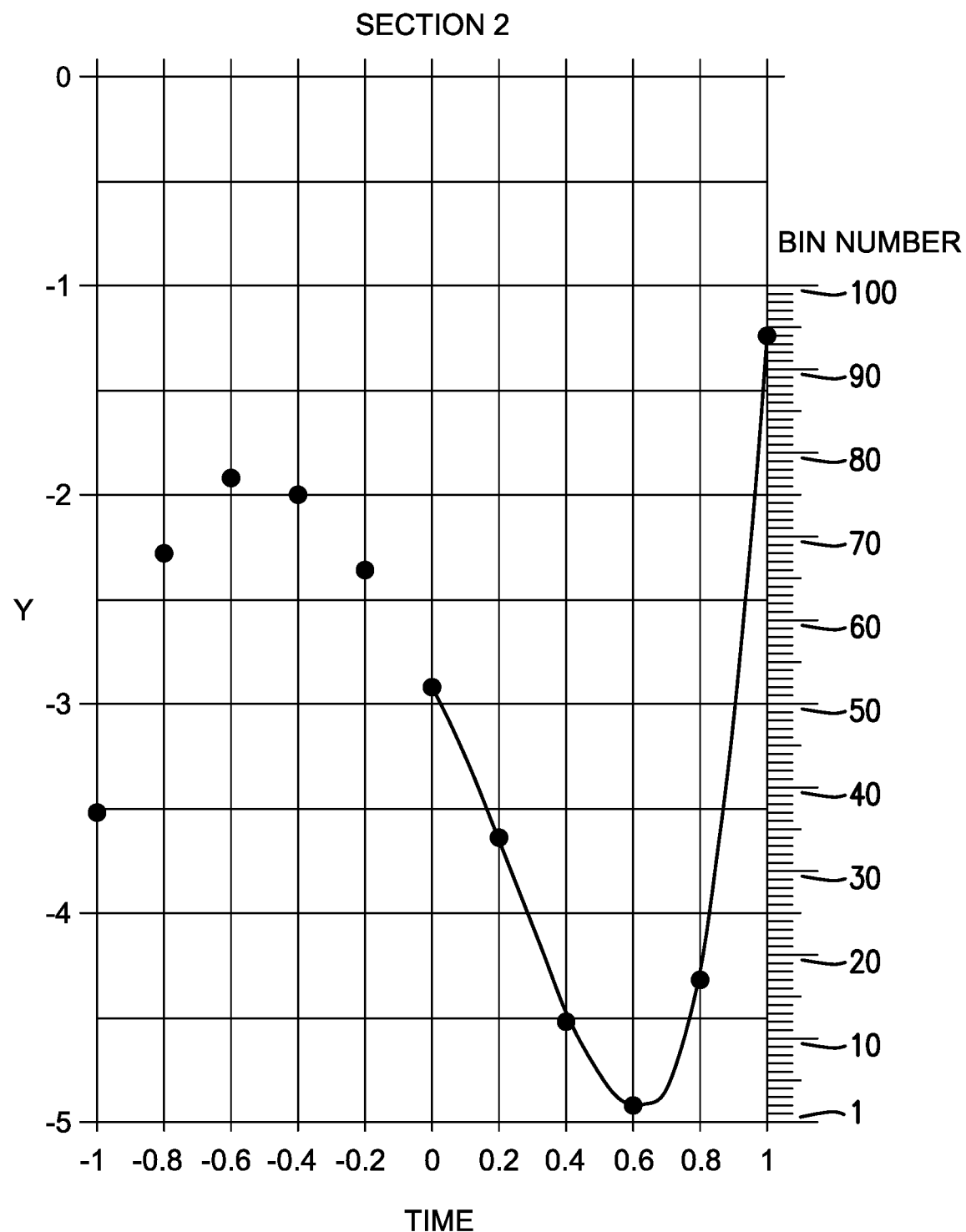
Figure 15A:
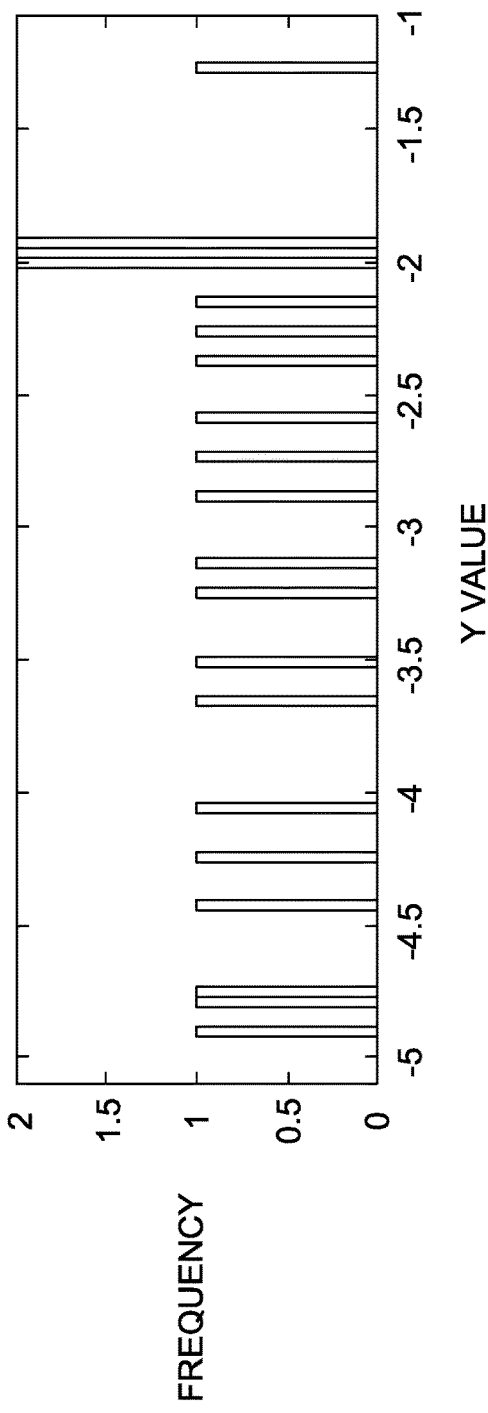
Figure 15B:
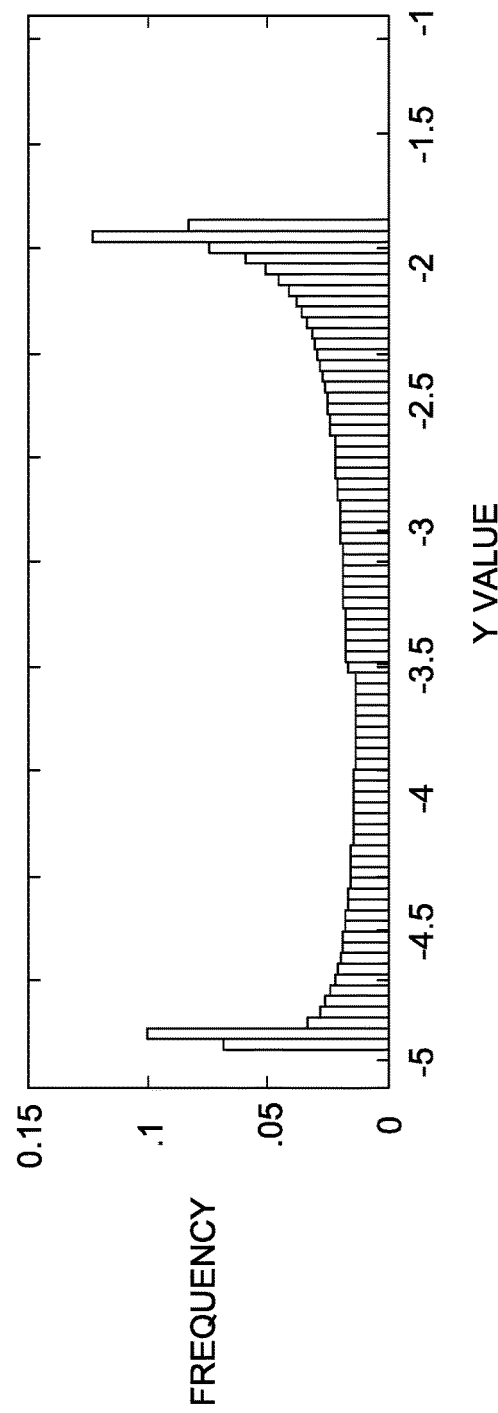

FIGS. 3A, 3B, and 3C list the blocks of an algorithm for generating histogram data for a plurality of sampled data points;

FIG. 4 shows a plurality of sampled data points and lines drawn therebetween from the waveform of FIG. 2, along with a plurality of bins, upper bound and lower bound values of each bin, a plurality of linear equations, and a plurality of time equations;

FIG. 5 is a table of a portion of the data resulting from executing the algorithm of FIGS. 3A, 3B, and 3C;

FIG. 6 is a table of exemplary histogram data generated by embodiments of the current invention and by prior art techniques;

FIG. 7 is a histogram of the data from the table of FIG. 6 generated by using embodiments of the current invention;

FIG. 8 is a histogram of the data from the table of FIG. 6 generated by using prior art techniques;

FIG. 9 is a listing of at least a portion of the steps of a method for generating histogram data for a plurality of sampled data points;

FIG. 10 is a listing of at least a portion of the steps of another method for generating histogram data for a plurality of sampled data points;

FIGS. 11A and 11B include a listing of at least a portion of the steps of yet another method for generating histogram data for a plurality of sampled data points;

FIG. 12 is a plot of y values vs. time for a plurality of original sampled data points;

FIG. 13A is a plot of y values vs. time illustrating a first polynomial equation waveform for a first section of sampled data points and a plurality of bins and bin numbers;

FIG. 13B is a plot of y values vs. time illustrating a second polynomial equation waveform for a second section of sampled data points and the bins and bin numbers;

FIG. 14A shows a table including section numbers, bin numbers, boundary values for each bin, and first and second subsection time values according to a first embodiment;

FIGS. 14B and 14C show a table including section numbers, bin numbers, boundary values for each bin, and time values according to a second embodiment;

FIG. 15A is a histogram of the waveforms of FIGS. 13A and 13B using prior art techniques; and FIG. 15B is a histogram of the waveforms of FIGS. 13A and 13B using the current inventive method illustrated in FIGS. 11A and 11B.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
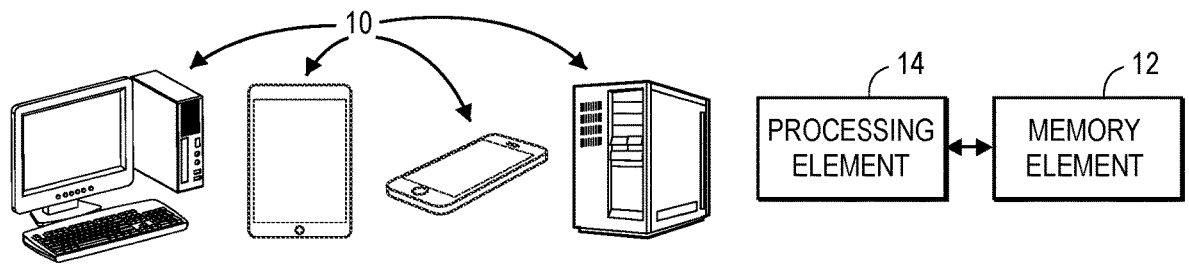
FIG. 1 is a view of a plurality of computing devices along with electronic components, each constructed in accordance with various embodiments of the current invention, and each configured to generate histogram data for a plurality of sampled data points.

Referring to FIG. 1, a computing device 10 for generating histogram data, constructed in accordance with various embodiments of the current invention, is shown in FIG. 1. In some instances, the computing device 10 may be embodied by server computers, workstation computers, desktop computers, or the like which are able to receive a file of sampled data and generate histogram data. In other instances, the computing device 10 may be embodied by laptop computers, palmtop computers, notebook computers, tablets or tablet computers, smart phones, mobile phones, cellular phones, personal digital assistants (PDAs), smart watches or wearables, or the like which include components, such as video cameras, microphones, sensors, and so forth, that are able to stream sampled data or generate a file of sampled data on which the computing device 10 can generate histogram data. The computing device 10 broadly comprises, among other components, a memory element 12 and a processing element 14. In some embodiments, the computing device 10 may further include electronic circuitry such as analog to digital converters (ADCs), amplifiers, filters, and the like.

The memory element 12 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 12 may be embedded in, or packaged in the same package as, the processing element 14. The memory element 12 may include, or may constitute, a non-transitory "computer-readable medium". The memory element 12 may store the instructions, code, code statements, code segments, software, firmware, programs, applications, apps, services, daemons, or the like that are executed by the processing element 14. The memory element 12 may also store data that is received by the processing element 14 or the device in which the processing element 14 is implemented. The processing element 14 may further store data or intermediate results generated during processing, calculations, and/or computations as well as data or final results after processing, calculations, and/or computations. In addition, the memory element 12 may store settings, data, documents, sound files, photographs, movies, images, databases, and the like.

The processing element 14 may comprise one or more processors. The processing element 14 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 14 may generally execute, process, or run instructions, code, code segments, code statements, software, firmware, programs, applications, apps, processes, services, daemons, or the like. The processing element 14 may also include hardware components such as registers, finite-state machines, sequential and combinational logic, and other electronic circuits that can perform the functions necessary for the operation of the current invention. In certain embodiments, the processing element 14 may include multiple computational components and functional blocks that are packaged separately but function as a single unit. The processing element 14 may be in electronic communication with the other electronic components through serial or parallel links that include universal busses, address busses, data busses, control lines, and the like.

Referring to FIG. 2, a plot of y vs. time for a waveform with a plurality of sampled data points is shown. Also shown is a table listing the sampled data points, including a point number, a t (time) value, and a y value, associated with the waveform. The waveform may represent the electric voltage, or other electrical characteristic, received by the computing device 10 from a microphone, a video camera, a sensor, such as a temperature sensor, a motion sensor, or the like. The data points may be sampled directly from the waveform by the computing device 10. Alternatively, the data points may be received from an external sampling unit which has already sampled the waveform and generated the data points. The time scale for the plot and the data points may be in units of seconds or may be in other units of time, such as milliseconds, microseconds, etc.

After either sampling the waveform and generating the data points or receiving the sampled data points, the processing element 14, through the usage of hardware, software, firmware, or combinations thereof, performs the following algorithm 100, as shown in the flowchart in FIGS. 3A, 3B, and 3C, to generate histogram data for the sampled data points of the waveform. The processing element 14, or control components associated therewith, stores the sampled data points, along with intermediate calculation results discussed below, in the memory element 12. Referring to block 101, an array of bins named "results" is defined. Each element, or bin, of the array is a real number that represents an amount of time a linear interpolation approximation of the waveform has a y value within a range of values of the bin—that is, the histogram data which is used to form a histogram. The total number of bins, "bintotal", may be a fixed value or may be set by the user before executing the algorithm. The numbers of bins determines the resolution of the histogram data. In general, a greater number of bins provides higher resolution of the histogram data, while a smaller number of bins provides lower resolution of the histogram data. In the example of the implementation of the algorithm 100 shown in FIGS. 4-6, the results array has 13 bins.

Referring to block 102, boundary values for each bin are determined. First, the range, or width, of each bin is determined. Typically, each bin has the same range. Although in some embodiments, some bins may have a first range, while other bins may have one or more different ranges. When each bin has the same range, the range is determined by dividing the total range of the y values by the total number of bins. In the example shown in the figures, the bin range equals the total range of the y values (6.5-0=6.5) divided by the total number of bin (13), which yields a bin range, or width, of 0.5. The upper bound of each bin is then determined by multiplying the bin number by the range. The lower bound of each bin is determined by subtracting the range from the upper bound. The upper bound and the lower bound for each bin of the example is shown in FIG. 4.

Referring to block 103, the sampled data points are received, with each data point including a t value and a y value, as shown in FIG. 2. The data points are stored in the memory element 12.

Referring to block 104, each consecutive pair of data points is evaluated, one data point at a time in overlapping succession. That is, a current data point and a next data point are evaluated. The first time, the current data point is the first data point, and the next data point is the second data point. The second time, the current data point is the second data point, and the next data point is the third data point. And so forth until the last data point is the current data point.

Referring to block 105, it is determined whether the current data point is the last data point. If so, then the algorithm 100 terminates. If not, then block 106 is the next step.

Referring to block 106, "startbin" is defined as the bin number of the current data point. (The symbol "#" is generally used in the figures for the word "number".) The determination of which bin number the current data point falls into may include a search algorithm, wherein the value of the current data point is compared with the range of values for one or more bins until the bin number is found wherein the value of the current data point falls within the range of values for the bin.

Referring to block 107, "stopbin" is defined as the bin number of the next data point. As with the startbin, a search algorithm may be used to determine the stopbin, that is, which bin number corresponds to the next data point.

Referring to block 108, it is determined whether the startbin is equal to the stopbin. If so, then this is an indication that the waveform is relatively flat or maintaining roughly the same value over time. Block 122 is the next step. If not, the waveform is changing value, and block 109 is the next step.

Referring to block 109, a linear equation for a line between the current data point and the next data point is determined. The linear equation provides linear interpolation between the two data points in order to determine the times at which the waveform has certain y values corresponding to the upper bound and/or the lower bound of the bins. While linear interpolation is presented as an example of the type of interpolation that could be used, other types of interpolation, such polynomial interpolation, spline interpolation, etc., could be utilized. The linear equation has a form of "y=mt+b", wherein "m" is the slope of the line, and "b" is the y-intercept of the line. The current data point and the next data point provides two points on the line from which the slope and the y-intercept can be calculated. Following the traditional principles of algebra, the slope is determined as: $m=(y_{current}-y_{next})/(t_{current}-t_{next})$. The y-intercept is determined as: $b=y_{current}-m*t_{current}$. The linear equations, and line number, for each consecutive pair of data points is shown in FIG. 4.

Referring to block 110, each bin number in succession from the startbin to the stopbin is compared to the startbin and the stopbin. That is, the bin number is set to startbin. Each time this step is performed after that, the bin number is incremented until it is equal to stopbin. The next time this step is performed, the bin number is set back to startbin.

Referring to block 111, it is determined whether the current bin number is equal to the stopbin. If so, then this is an indication that the line—which is the linear interpolation approximation of the waveform—has moved into the stopbin. And, block 112 is the next step. If not, then block 114 is the next step.

Referring to block 112, "intime" is defined by solving the linear equation for t when y equals the upper bound or the lower bound of the stopbin. Intime, for this block, is the time at which the line enters the stopbin (coming from another bin). Solving the linear equation for t results in the "time equation", which has the general form: $t=(y-b)/m$. Each of the linear equations solved for t in the current example are shown in FIG. 4. The upper bound or the lower bound of the stopbin are substituted for y according to the sign of the slope m. If the slope m is positive, then the line is entering the stopbin through the lower bound, and the lower bound is substituted for y. If the slope m is negative, then the line is entering the stopbin through the upper bound, and the upper bound is substituted for y. Given the values for y, b, and m, the time equation is solved for t. And, intime equals t.

Referring to block 113, "time" is defined as the difference between the time of the next data point, which is a known sampled data point, and the time at which the line entered the stopbin, which is intime. Thus, time equals $t_{next\ data\ point}$−intime. The next step is block 120.

Referring to block 114, it is determined whether the current bin number is equal to the startbin. If so, then this is an indication that the line has moved out of the startbin. And, block 115 is the next step. If not, then block 117 is the next step.

Referring to block 115, "outtime" is defined by solving the linear equation for t (the time equation) when y equals the upper bound or the lower bound of the startbin. Outtime, for this block, is the time at which the line exits the startbin (going to another bin). The time equation has the general form: $t=(y-b)/m$. The upper bound or the lower bound of the stopbin are substituted for y according to the sign of the slope m. If the slope m is positive, then the line is exiting the startbin through the upper bound, and the upper bound is substituted for y. If the slope m is negative, then the line is exiting the startbin through the lower bound, and the lower bound is substituted for y. Given the values for y, b, and m, the time equation is solved for t. And, outtime equals t.

Referring to block 116, "time" is defined as the difference between the time at which the line exited the startbin, which is outtime, and the time of the current data point, which is a known sampled data point. Thus, time equals outtime−$t_{current\ data\ point}$. The next step is block 120.

Referring to block 117, "intime" is defined by solving the linear equation for t (the time equation) when y equals the upper bound or the lower bound of the current bin. Intime, for this block, is the time at which the line enters the current bin (coming from another bin). The time equation has the general form: $t=(y-b)/m$. The upper bound or the lower bound of the current bin are substituted for y according to the sign of the slope m. If the slope m is positive, then the line is entering the current bin through the lower bound, and the lower bound is substituted for y. If the slope m is negative, then the line is entering the current bin through the upper bound, and the upper bound is substituted for y. Given the values for y, b, and m, the time equation is solved for t. And, intime equals t.

Referring to block 118, "outtime" is defined by solving the linear equation for t (the time equation) when y equals the upper bound or the lower bound of the current bin. Outtime, for this block, is the time at which the line exits the current bin (going to another bin). The time equation has the general form: $t=(y-b)/m$. The upper bound or the lower bound of the current bin are substituted for y according to the sign of the slope m. If the slope m is positive, then the line is exiting the current bin through the upper bound, and the upper bound is substituted for y. If the slope m is negative, then the line is exiting the current bin through the lower bound, and the lower bound is substituted for y. Given the values for y, b, and m, the time equation is solved for t. And, outtime equals t.

Referring to block 119, "time" is defined as the difference between the time at which the line exited the current bin, which is outtime, and the time at which the line entered the current bin, which is intime. Thus, time equals outtime−intime. The next step is block 114.

Referring to block 120, time is added, as an accumulation, to the bin of the results array pointed to by the current bin number. That is, results[bin #]=results[bin #]+time.

Referring to block 121, it is determined whether the current bin number is equal to the stopbin. If so, then this is an indication that the line has terminated, and the next pair of data points should be evaluated. Block 104 is the next step. If not, then the next bin number should be evaluated, and block 110 is the next step.

Referring to block 122, "time" is defined as the difference between the time of the next data point, which is a known sampled data point, and the time of the current data point, which is a known sampled data point. Thus, time equals $t_{next\ data\ point}$−$t_{current\ data\ point}$.

Referring to block 123, time is added, as an accumulation, to the bin of the results array pointed to by the current bin number. That is, results[bin #]=results[bin #]+time.

Referring to FIG. 5, a tabular listing of at least a portion of the data resulting from executing the algorithm 100 is shown. The data is shown for executing the algorithm 100 for data points 1-4, which includes lines 1-3. The data includes listings of the current data point, the next data point, the startbin for the pairs of data points (current and next), and the stopbin for the pairs of data points. The data also includes the bin numbers encountered between the startbin and the stopbin, as well as the line number, referenced in FIG. 4, formed between the two data points. The data further includes the time equation, with the appropriate values plugged in, for each bin number. The data also includes intime and outtime for each bin through which the line passes. In addition, the data includes the time that the line spent in each bin, as well as the accumulated results for each bin number as the bin result was calculated.

Referring to line 1 of the table of FIG. 5, the current data point is 1 and the next data point is 2, as determined from block 104. The current data point is not the last data point, as determined in block 105. So the steps of blocks 106 and 107 are performed, resulting in startbin=2 and stopbin=9. In block 108, it is determined that startbin is not equal to stopbin, so the step of block 109 is performed resulting in the linear equation for line #1 shown in FIG. 4. The slope of the line and the y-intercept are also calculated. In the step of block 110, each bin number between, and including, startbin and stopbin is compared with startbin and stopbin. As shown in line 1 of the table of FIG. 5, the current bin number, which is the first bin number, is 2. In the step of block 111, it is determined that the current bin number (2) is not equal to stopbin (9). In the step of block 114, it is determined that the current bin number (2) is equal to startbin (2). Thus, the step of block 115 is performed. The time equation is shown in line 1 of the table of FIG. 5. Since the slope of the time equation is positive, the upper bound (1) of bin number 2 is substituted for y. Therefore, the time equation, with the proper values plugged in, is: $t=(1-0.8)/3.6$. According to the step of block 115, outtime=t=0.06. In performing the step of block 116, time=outtime−$t_{current\ data\ point}$. In this case, $t_{current\ data\ point}$=0. Then, time=0.06−0=0.06. In performing the step of block 120, time is added to the bin of the results array pointed to by the current bin number. Thus, results[bin 2]=results[bin 2]+time=0+0.06=0.06, as shown in the last column of line 1 of the table of FIG. 5. In block 121, it is determined that the current bin number (2) is not equal to stopbin (9). Hence, block 110 is the next step.

Referring to line 2 of the table of FIG. 5, the current data point is still 1 and the next data point is still 2, but the current bin number has been incremented to 3 as performed in the step of block 110. In the step of block 111, it is determined that the current bin number (3) is not equal to stopbin (9). In the step of block 114, it is determined that the current bin number (3) is not equal to startbin (2). Thus, the step of block 117 is performed. The time equation is shown in line 2 of the table of FIG. 5. Since the slope of the time equation is positive, the lower bound (1) of bin number 3 is substituted for y. Therefore, the time equation, with the proper values plugged in, is: t=(1−0.8)/3.6. According to the step of block 117, intime=t=0.06.

Referring to line 3 of the table of FIG. 5, the data for the current data point, the next data point, startbin, stopbin, bin number, and line number are still the same as in line 2 of the table. But, in performing the step of block 118, outtime is to be calculated with the upper bound (1.5) of bin number 3 being substituted for y in the time equation. Therefore, the time equation, with the proper values plugged in, is: t=(1.5−0.8)/3.6. According to the step of block 118, outtime=t=0.19. In performing the step of block 119, time=outtime (from the step of block 118)−intime (from the step of block 117). Then, time=0.19−0.06=0.13. In performing the step of block 120, time is added to the bin of the results array pointed to by the current bin number. Thus, results[bin 3]=results[bin 3]+time=0+0.13=0.13, as shown in the last column of line 3 of the table of FIG. 5. In block 121, it is determined that the current bin number (3) is not equal to stopbin (9). Hence, block 110 is the next step.

The data in the rest of the table of FIG. 5 is determined or calculated in a similar fashion as discussed in the preceding paragraphs. The final values of the bins of the results array for this example are shown in FIG. 6. The results of a prior art type of histogram data calculation are also shown in FIG. 6. A histogram derived from the data generated from various embodiments of the current invention is shown in FIG. 7. A histogram derived from the data generated by prior art techniques is shown in FIG. 8. It can be seen that there are differences between the histogram data and histogram of the current invention and the prior art histogram data and histogram. The histogram data and histogram of the current invention recognizes that the waveform may have a value in bins other than those of the sample data points alone—as indicated by the fact that results of the current invention of bins 3, 4, 5, 6, and 10 and the associated waveform ranges of 1-3 and 4.5-5 have a value, whereas the same bins and waveform ranges for the prior art histogram do not have a value.

FIG. 9 depicts a listing of at least a portion of the steps of an exemplary computer-implemented method 200 for generating histogram data for a plurality of sampled data points. The steps may be performed in the order shown in FIG. 9, or they may be performed in a different order. Furthermore, some steps may be performed concurrently as opposed to sequentially. In addition, some steps may be optional or may not be performed. The steps may be performed by the processing element 14 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 12.

Referring to step 201, a plurality of sampled data points is received. Each data point includes a y value and a t value. The data points are stored in the memory element 12.

Referring to step 202, an array of bins named "results" is defined—results[ ]. Each element, or bin, of the array is a real number that represents an amount of time a linear interpolation approximation of the waveform has a y value within a range of values of the bin—that is, the histogram data. The total number of bins, "bintotal", may be a fixed value or may be set by the user before executing the algorithm. The numbers of bins determines the resolution of the histogram data. In general, a greater number of bins provides higher resolution of the histogram data, while a smaller number of bins provides lower resolution of the histogram data. In an example of the method 200 shown in FIGS. 4-6, the results array has 13 bins.

Referring to step 203, an upper bound and a lower bound for each bin are determined. First, the range, or width, of each bin is determined. Typically, each bin has the same range. Although in some embodiments, some bins may have a first range, while other bins may have one or more different ranges. When each bin has the same range, the range is determined by dividing the total range of the y values by the total number of bins. In the example shown in the figures, the bin range equals the total range of the y values (6.5−0=6.5) divided by the total number of bin (13), which yields a bin range, or width, of 0.5. The upper bound of each bin is then determined by multiplying the bin number by the range. The lower bound of each bin is determined by subtracting the range from the upper bound. The upper bound and the lower bound for each bin of the example is shown in FIG. 4.

Referring to step 204, for each consecutive pair of data points including a current data point and a next data point, a linear equation for a line between the current data point and the next data point is determined. The linear equation provides interpolation between the two data points in order to determine the times at which the waveform has certain y values corresponding to the upper bound and/or the lower bound of the bins. The linear equation has a form of "y=mt+b", wherein "m" is the slope of the line, and "b" is the y-intercept of the line. The current data point and the next data point provides two points on the line from which the slope and the y-intercept can be calculated. Following the traditional principles of algebra, the slope is determined as: $m=(y_{current}-y_{next})/(t_{current}-t_{next})$. The y-intercept is determined as: $b=y_{current}-m*t_{current}$. The linear equations, and line number, for each consecutive pair of data points of the example is shown in FIG. 4.

Referring to step 205, for each line, an amount of time that the y value of the line is within the range of values for each bin from the current data point to the next data point is determined. "startbin" is defined as the bin number of the current data point. "stopbin" is defined as the bin number of the next data point. The linear equation is solved for t is the time equation, which has the general form: t=(y−b)/m. The values for y intercept, b, and slope, m, are known from step 204. For each bin from the startbin to the stopbin, the time that the line enters the bin is calculated by substituting the upper bound or the lower bound for y in the time equation, wherein the upper bound or the lower bound of the bin are substituted for y according to the sign of the slope m. The time that the line exits the bin is calculated by substituting the upper bound or the lower bound for y in the time equation, wherein the upper bound or the lower bound of the bin are substituted for y according to the sign of the slope m. The total time is calculated by subtracting the entry time from the exit time. The total time is calculated in this fashion for each bin from the startbin to the stopbin. The calculations are also repeated in this fashion for each line.

Referring to step 206, the time is added to the histogram data for each bin. As the time that the y value of the line is within the range of values for each bin is calculated, it is added to the histogram data for that bin. That is, results[bin #]=results[bin #]+time.

FIG. 10 depicts a listing of at least a portion of the steps of another exemplary computer-implemented method 300 for generating histogram data for a plurality of sampled data points. The steps may be performed in the order shown in FIG. 10, or they may be performed in a different order. Furthermore, some steps may be performed concurrently as opposed to sequentially. In addition, some steps may be optional or may not be performed. The steps may be performed by the processing element 14 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 12.

Referring to step 301, a plurality of sampled data points is received. Each data point includes a y value and a t value. The data points are stored in the memory element 12.

Referring to step 302, an array of bins named "results" is defined—results[ ]. Each element, or bin, of the array is a real number that represents an amount of time a linear interpolation approximation of the waveform has a y value within a range of values of the bin—that is, the histogram data. The total number of bins, "bintotal", may be a fixed value or may be set by the user before executing the algorithm. The numbers of bins determines the resolution of the histogram data. In general, a greater number of bins provides higher resolution of the histogram data, while a smaller number of bins provides lower resolution of the histogram data. In an example of the method 300 shown in FIGS. 4-6, the results array has 13 bins.

Referring to step 303, an upper bound and a lower bound for each bin are determined. First, the range, or width, of each bin is determined. Typically, each bin has the same range. Although in some embodiments, some bins may have a first range, while other bins may have one or more different ranges. When each bin has the same range, the range is determined by dividing the total range of the y values by the total number of bins. In the example shown in the figures, the bin range equals the total range of the y values (6.5− 0=6.5) divided by the total number of bin (13), which yields a bin range, or width, of 0.5. The upper bound of each bin is then determined by multiplying the bin number by the range. The lower bound of each bin is determined by subtracting the range from the upper bound. The upper bound and the lower bound for each bin of the example is shown in FIG. 4.

Referring to step 304, for each consecutive pair of data points including a current data point and a next data point, a linear equation for a line between the current data point and the next data point is determined. The linear equation provides interpolation between the two data points in order to determine the times at which the waveform has certain y values corresponding to the upper bound and/or the lower bound of the bins. The linear equation has a form of "y=mt+b", wherein "m" is the slope of the line, and "b" is the y-intercept of the line. The current data point and the next data point provides two points on the line from which the slope and the y-intercept can be calculated. Following the traditional principles of algebra, the slope is determined as: $m=(y_{current}-y_{next})/(t_{current}-t_{next})$. The y-intercept is determined as: $b=y_{current}-m*t_{current}$. The linear equations, and line number, for each consecutive pair of data points of the example is shown in FIG. 4.

Referring to step 305, a startbin including a bin number for the current data point and a stopbin including a bin number for the next data point are determined. The determination of which bin number the current or next data point falls into may include a search algorithm, wherein the value of the current or next data point is compared with the range of values for one or more bins until the bin number is found wherein the value of the current or next data point falls within the range of values for the bin.

Referring to step 306, for each consecutive bin from the startbin to the stopbin, an intime for when the line enters a range of the bin and an outtime for when the line exits the range of the bin are determined. The intime is calculated by substituting the upper bound or the lower bound of the current bin for y in the time equation, wherein the upper bound or the lower bound are substituted for y according to the sign of the slope m. The outtime is calculated by substituting the upper bound or the lower bound of the current bin for y in the time equation, wherein the upper bound or the lower bound are substituted for y according to the sign of the slope m.

Referring to step 307, a total time equaling the outtime minus the intime is determined. The total time is calculated for each bin.

Referring to step 308, the total time for each bin from the startbin to the stopbin is added to the histogram data of the array bin. That is, results[bin #]=results[bin #]+time. The calculation of the total time and the adding of the total time to the histogram data for each bin is repeated for each line.

An additional embodiment of the current invention provides another exemplary computer-implemented method 1A for generating histogram data for a plurality of sampled data points. FIGS. 11A and 11B depict a listing of at least a portion of the steps of the method 400. The steps may be performed in the order shown in FIGS. 11A and 11B, or they may be performed in a different order. Furthermore, some steps may be performed concurrently as opposed to sequentially. In addition, some steps may be optional or may not be performed. The steps may be performed by the processing element 14 of the computing device 10 via hardware, software, firmware, or combinations thereof. Moreover, the steps may be implemented as instructions, code, code segments, code statements, a program, an application, an app, a process, a service, a daemon, or the like, and may be stored on a computer-readable storage medium, such as the memory element 12.

Referring to step 401, a plurality of sampled data points is received. Each data point includes a y value, which varies according to, or corresponds to, the sampled electrical characteristic, and a t value, which may indicate an absolute time of the sample, such as a timestamp, or a relative time, such as a sample period offset. The data points are stored in the memory element 12.

Referring to FIG. 12, a plot of y vs. time for the sampled data points is shown. The waveform may represent the electric voltage, or other electrical characteristic, received by the computing device 10 from a microphone, a video camera, a sensor, such as a temperature sensor, a motion sensor, or the like. The data points may be sampled directly from the waveform by the computing device 10. Alternatively, the data points may be received from an external sampling unit which has already sampled the waveform and generated the data points. The time scale for the plot and the data points may be in units of seconds or may be in other units of time, such as milliseconds, microseconds, etc.

Referring to step 402, a plurality of bins is defined, with each bin representing a range of y values that the sampled data points could have. Typically, the bins have to cover the extent of y values of the sampled data points. The extent of y values of the sampled data points is known from the specifications of the output of the external sampling unit or ADCs, either in the sampling unit or the computing device 10. In an example of the method 400 shown in FIGS. 13A, 13B, and 14, there are 100 bins, which cover the y values from −5 to −1. There may be additional bins not shown in the figures that extend to a y value of +5, for instance.

Referring to step 403, an array of elements named "results" is defined—results[ ]. Each element of the array is associated with a successive one of the bins, and accordingly, there are the same number of elements of the array (100) as there are bins. Each element of the array includes a real number that represents an amount of time an approximation of the waveform from which the data points (shown in FIG. 12) were sampled has a y value within a range of values of the bin—that is, the histogram data. The array results[ ] is reset every time method 400 is implemented so that each element of the array starts with a value of zero.

Referring to step 404, an upper bound value and a lower bound value for each bin are determined. First, the width of each bin is determined. Typically, each bin has the same width. Although in some embodiments, some bins may have a first width, while other bins may have one or more different width. When each bin has the same width, the width is determined by dividing the total range of the y values by the total number of bins. In the example shown in the figures, the range of the bins includes y values from −5 to −1, which yields a range of 4. With 100 bins in use, the width of each bin is 100 divided by 4, which equals 0.04 per bin. The upper bound value of each bin is then determined by multiplying the bin number by the width and adding the product to the lowest y value in the range. For example, bin #1 has an upper bound value of (1)*(0.04)+−5=−4.96. Bin #2 has an upper bound value of (2)*(0.04)+−5=−4.92. And so forth. The lower bound of each bin is determined by subtracting the width from the upper bound. For example, bin #1 has a lower bound value of −4.96−0.04=−5. Bin #2 has a lower bound value of −4.92−0.04=−4.96. And so forth.

Referring to step 405, the data points are divided into sections, such that each section has a start time and a stop time. The data points may be divided according to a number of points, that is, a selected number of points for each section, or a time period, that is, a selected time period for each section. The two choices are effectively the same unless the sample frequency changes while the points are being received and evaluated. The number of points or time period may be selected by a user or may be automatically set by the computing device 10. The data points are also divided so that adjacent sections share a stopping time and a starting time. In the exemplary set of data points shown in FIGS. 13A and 13B, two sections have been selected, each with a number of points each to 6 and a time period of 1, such that the first section has a start time of −1 and a stop time of 0, as shown FIG. 13A, and the second section has a start time of 0 and a stop time of 1, as shown in FIG. 13B.

In addition, each section may optionally include a plurality of subsections, wherein each subsection includes portions of the waveform with either a positive slope or a negative slope. The subsections are separated by the points on the waveform where the slope is zero. For example, the first section includes a first subsection with a positive slope from t=−1 to approximately t=−0.6 and a second subsection with a negative slope from approximately t=−0.6 to t=0. The second section includes a first subsection with a negative slope from t=0 to approximately t=0.6 and a second subsection with a positive slope from approximately t=0.6 to t=1.

Referring to step 406, a polynomial equation is assigned to each section of the data points. The polynomial equation may be first or second order, although third order and higher polynomial equations may produce better results because higher order polynomials may fit the data points more closely. A third order polynomial equation may have a format as follows: $y=At^3+Bt^2+Ct+D$, where A, B, C, and D are coefficients or constants. A curve fitting algorithm or application may be utilized during this step to determine the coefficients and constants of the equation so that the waveform or curve best fits the points of the section. The curve fitting algorithm may attempt to determine the coefficients and constants so that the waveform fits within a margin of error of each point. If the curve fitting algorithm cannot make the waveform fit within the margin of error, then one of at least a couple of options may be chosen. Either a higher order equation can be chosen for the curve fitting algorithm or the sampled data points may be divided again, by returning to step 405, so that each section includes fewer data points.

The waveforms that are assigned to the entire range of sampled data points form a continuous curve over the range. That is, the y-value endpoint of one section is the same y-value start point of the following section. And, the waveforms are continuous between the two sections although the slope of the waveform of the one section may be different from the slope of the waveform of the following section.

An exemplary polynomial equation for section 1 as shown in FIG. 13A has the form: $y=4.7t^3+1.9t^2-2.3t-2.9$. An exemplary polynomial equation for section 2 as shown in FIG. 13B has the form: $y=16t^3+12.9t^2-1.5t-2.9$.

Referring to step 407, a minimum value and a maximum value of each waveform section are determined. The minimum and maximum values may be determined by utilizing functions or algorithms that determine local minima and maxima of the associated polynomial function over the range of time for each section. For the exemplary section 1, the minimum value is −3.5 and the maximum value is −1.9. For the exemplary section 2, the minimum value is −4.9 and the maximum value is −1.25.

Referring to step 408, the bin numbers within a range between the minimum value and the maximum value for each section are determined. Given that the upper bound value and the lower bound value for each bin are determined in step 404, a search function or algorithm may be utilized to determine the bin numbers. For the exemplary section 1, the bin numbers include 38-78. For the exemplary section 2, the bin numbers include 2-93. Steps 407 and 408 are optional steps which may be performed to increase the efficiency of the method 400.

Referring to steps 409, 410, 411, and 412, a plurality of lower boundary times and a plurality of upper boundary times for each section are determined. Each lower boundary time is a time when the polynomial equation of each section has a value equal to the lower boundary value of each bin in the range. Each upper boundary time is a time when the polynomial equation of each section has a value equal to the upper boundary value of each bin in the range. If steps 407 and 408 were performed, then steps 409, 410, 411, and 412 are executed only on the bins within the minimum to maximum value range. If steps 407 and 408 were not performed, then steps 409, 410, 411, and 412 are executed on all of the bins. For those bins through which the waveform does not pass, i.e., not within the range, the values determined in performing steps 409, 410, 411, and 412 will be zero.

To perform steps 409, 410, 411, and 412, the polynomial equation may be solved for time (t), or numerical algorithms that determine one or more values for t when the value of y is known may be utilized. An array may be created in order to store the results of steps 409, 410, 411, and 412. Referring to FIG. 14A, a table is shown that includes exemplary contents of the array. The array may include an indication of the section, or there may be an array for each section. The array may include a plurality of elements, with one element for each bin in a single section or each bin in each section. Each element may include the section number, the bin number, optionally the lower boundary value and the upper boundary value, and a lower boundary time and an upper boundary time for each subsection of the waveform section.

When solving the polynomial equation for time values for each bin value, there may be multiple time values that are returned for each bin value. For example, when the polynomial equation is a third order equation, there may be up to three time values returned for some of the bin values. Any resulting time value that is outside of the time range, i.e., less than the start time or greater than the stop time, for the section or any time solutions that are imaginary are discarded. Also, when multiple time values are returned for the upper and lower boundary values of one or more bins, the time values are associated with one of the subsections of the waveform. In addition, the waveform will cross the start time and the stop time at the edges of each section. There is also one of the data points associated with each start time and each stop time. The data point has a y value and a time value. If the y value is equal to the upper boundary value or the lower boundary value for one of the bins, then the upper boundary time or the lower boundary time, as appropriate, will be equal to the time value of the data point. If the y value falls between the upper boundary value and the lower boundary value for a particular bin, then one of either the lower boundary value or the upper boundary value will have an associated lower boundary time or upper boundary time while the other will not. In such a case, the upper boundary time or the lower boundary time (whichever one was not previously determined) will equal the time value of the data point. Furthermore, whenever the local minimum or local maximum is crossed within a bin, then either the lower boundary value or the upper boundary value for two subsections of one section will not have an associated time value. This situation will have an impact on how the total time within the bin is calculated as discussed in subsequent steps.

Referring again to the exemplary data of FIG. 14A, in bin 38, there is a crossing of the start time. For the lower boundary value of −3.52, there are three time values returned—all of which are either less than the start time or greater then the stop time. So, they are discarded. But, one value for the upper boundary time for bin 38 is −0.995 and is between the start time and the stop time. Thus, the upper boundary value has an associated time value, while the lower boundary value does not. In this case, the start time (−1) is closer than the stop time (0) to the upper boundary time (−0.995), so the start time assigned to the lower boundary time for bin 38. For bins 39-52, there is only one time value that is within the time range (between the start time and the stop time) for each boundary value, so only one time value is stored in the array for the lower boundary time and the upper boundary time for each of those bins in section 1.

In bin 53, there is a crossing of the stop time. For the lower boundary value of −2.92, there are three time values returned, but only one (−0.925) is within the time range. For the upper boundary value of −2.88, there are three time values returned, now with two time values that are within range. A first time value, −0.92, is from the first subsection, and a second time value, −0.01, is from the second subsection. Thus, for the second subsection, the upper boundary value has an associated time value, while the lower boundary value does not. In this case, the stop time (0) is closer than the start time (−1) to the upper boundary time (−0.01), so the stop time assigned to the lower boundary time for bin 53. For bins 54-77, there are two time values (one is associated with the first subsection and one is associated with the second subsection) that are within the time range for each boundary value. So, two time values are stored in the array for the lower boundary time (one associated with the first subsection and one associated with the second subsection) and two time values are stored in the array for the upper boundary time (one associated with the first subsection and one associated with the second subsection) for each of those bins in section 1.

In bin 78, the local maximum is crossed. For the lower boundary value of −1.92, there are three time values returned, but only two (−0.62, −0.46) are within the time range. For the upper boundary value of −1.88, there is only one value returned, but it is outside the time range. This is because the local maximum of −1.9 has been crossed. Thus, the lower boundary value for each of the first subsection and the second subsection has an associated time value, while the upper boundary value does not. In this case, the total time within bin 78 is calculated differently from the other bins, as discussed in subsequent steps.

Alternatively, the lower boundary times and the upper boundary times can be determined without regard for the subsections. Referring FIGS. 14B and 14C, a table is shown that includes alternative contents of the array. In the alternative embodiment, there is only one column for the time values. That is, all of the time values that are returned for the lower boundary times and the upper boundary times for each bin are stored in the array in the same element for the bin for all sections. In addition, the lower boundary times and the upper boundary times are sorted in order of time value from smallest to largest. But, each lower boundary time is still associated with the lower boundary value, and each upper boundary time is still associated with the upper boundary value. For example, for bins 38-52, only one time value for each of the lower boundary time and the upper boundary time is returned for each bin, and they are stored in ascending order. For bins 53-77, two time values for each of the lower boundary time and the upper boundary time are returned for each bin, and they are stored in ascending order. For bin 78, there are two values returned for the lower boundary time and none for the upper boundary time.

Referring to step 413, a plurality of subsection bin times is calculated—one or more for each bin in each section. Each subsection bin time is calculated as a magnitude of a difference between the upper boundary time and the lower boundary time associated with the same subsection. For example, as shown in FIG. 14A, for bin 38, the first (and only) subsection bin time is equal to: |(−0.995)−(−1)|=0.005. For bins 38-52, there is only one subsection bin time to calculate. For bins 53-77, there are two subsection bin times to calculate, one associated with each subsection. At bin 78, there is only a lower boundary time for each of subsections 1 and 2. This is an indication of a local maximum being crossed within the bin. In such a case, there is no subsection bin time, but rather a section bin time, which is the magnitude of the difference between the two lower boundary times. That is, the section bin time is equal to: $|(-0.46)-(-0.62)|=0.16$. In embodiments in the waveform for each section was not divided into subsections, step 413 may not be performed.

Referring to step 414, the subsection bin times are accumulated to create a plurality of section bin times, one section bin time for each bin in each section. For the first section, as shown in FIG. 14A, the section bin time for bins 38-52 is simply the subsection bin time. For bins 53-77, the section bin time is the sum of the two subsection times. And for bin 78, the section bin time was already calculated in step 413.

Alternatively, the section bin times may be calculated by determining a magnitude of a difference between the time values for each bin in pairs, and then adding the magnitudes together. Referring to FIGS. 14B and 14C, for bins 38-52, there is only one pair of time values for each bin, so the section bin time for those bins is simply the magnitude of the difference between the time values. For example, for bin 38, the section bin time is equal to: $|(-0.995)-(-1)|=0.005$. For bins 53-77, the section bin time is equal to the sum of the magnitude of the differences between the two sorted pairs of time values. For example, for bin 53, the section bin time is equal to: $|(-0.92)-(-0.925)|+|(0)-(-0.01)|=0.015$. For bin 78, the local maximum was crossed so there is only one pair of time values. Thus, the section bin time is equal to: $|(-0.46)-(-0.62)|=0.16$.

Referring to step 415, the section bin times for each section are added to the results array in the array bin pointed to by each bin number. For example, using the data shown in FIG. 14A, the section bin time for bin 38 in section 1 is 0.005. The value 0.005 is added to the results array at bin 38. Given that before receiving data from the first section, the results array is empty, after receiving the first section data, results[38]=0.005. The remainder of the section bin times for the bins in the first section are added to the results array in the same way. Subsequently, the section bin times for the remaining sections are added to the results array in the same fashion.

Referring to FIGS. 15A and 15B, a comparison of a prior art histogram and the current inventive histogram is shown. The prior art histogram of FIG. 15A illustrates a number of times, i.e., frequency, that the waveforms of sections 1 and 2 (from FIGS. 13A and 13B) have the y values as shown. The current inventive histogram of FIG. 15B illustrates an amount of time that the waveforms of sections 1 and 2 have the y values as shown. It can be seen that there are significant differences as the current inventive histogram records the amount of time that the waveform has a small range of values, i.e. the bin values, rather than recording just the occurrence when the waveform has a single value, as the prior art histogram does.

Furthermore, by dividing the data points into sections and assigning a curve fit polynomial equation based waveform to each section, the shape of the original waveform (before sampling) is more accurately represented. This allows for more accurately evaluating the times at which the waveform enters and leaves each bin that results in a more accurate histogram analysis.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A computer-implemented method for generating histogram data for a plurality of sampled data points, the computer-implemented method comprising:
    receiving a plurality of sampled data points, each data point including a y value and a t value;
    defining a plurality of bins, each bin having a unique number and representing a range of y values that the sampled data points could have;
    defining an array of elements, each element associated with a successive one of the bins and including histogram data for the associated range of y values;
    dividing the sampled data points into a plurality of sections, each section including a start time and a stop time;
    assigning a plurality of polynomial equations, one polynomial equation to each section, each polynomial equation having a waveform that fits the data points of the associated section;
    determining a plurality of section bin times, one section bin time for each bin in each section, each section bin time determined using the polynomial equation and indicating an amount of time that the waveform has values in the range of one of the bins; and
    adding the section bin time for each bin in each section to the histogram data in the array element pointed to by the number of the bin.

2. The computer-implemented method of claim 1, further comprising determining a lower boundary value and an upper boundary value for each bin.

3. The computer-implemented method of claim 1, further comprising
    determining a minimum value and a maximum value of the waveform of each section; and
    determining a plurality of bin numbers within a range between the minimum value and the maximum value.

4. The computer-implemented method of claim 1, further comprising
determining a lower boundary value and an upper boundary value for each bin;
determining a plurality of lower boundary times for each section, each bin having one or more lower boundary times, the one or more lower boundary times being the one or more times at which the waveform in the section has a y value equal to the lower boundary value of the associated bin; and
determining a plurality of upper boundary times for each section, each bin having one or more upper boundary times, the one or more upper boundary times being the one or more times at which the waveform in the section has a y value equal to the upper boundary value of the associated bin.

5. The computer-implemented method of claim 4, wherein
determining the lower boundary times includes omitting any times the waveform in the section has a y value equal to the lower boundary value of the associated bin that are less than the start time or greater than the stop time, and
determining the upper boundary times includes omitting any times the waveform in the section has a y value equal to the upper boundary value of the associated bin that are less than the start time or greater than the stop time.

6. The computer-implemented method of claim 4, further comprising
dividing each section into a plurality of subsections, each subsection being defined by a slope of the waveform of the section;
associating each lower boundary time for each bin for each section with one of the subsections;
associating each upper boundary time for each bin for each section with one of the subsections; and
determining a plurality of subsection bin times, each subsection bin time equaling a magnitude of a difference of the upper boundary time and the lower boundary time associated with each subsection for each bin.

7. The computer-implemented method of claim 6, further comprising determining each section bin time as a sum of the subsection bin times for each bin in the associated section.

8. A computing device for generating histogram data for a plurality of sampled data points, the computing device comprising:
a memory element configured to store sampled data points, each data point including a y value and a t value; and
a processing element in electronic communication with the memory element, the processing element configured to
receive a plurality of sampled data points, each data point including a y value and a t value,
define a plurality of bins, each bin having a unique number and representing a range of y values that the sampled data points could have,
define an array of elements, each element associated with a successive one of the bins and including histogram data for the associated range of y values,
divide the sampled data points into a plurality of sections, each section including a start time and a stop time,
assign a plurality of polynomial equations, one polynomial equation to each section, each polynomial equation having a waveform that fits the data points of the associated section,
determine a plurality of section bin times, one section bin time for each bin in each section, each section bin time determined using the polynomial equation and indicating an amount of time that the waveform has values in the range of one of the bins, and
add the section bin time for each bin in each section to the histogram data in the array element pointed to by the number of the bin.

9. The computing device of claim 8, wherein the processing element is further configured to determine a lower boundary value and an upper boundary value for each bin.

10. The computing device of claim 8, wherein the processing element is further configured to
determine a minimum value and a maximum value of the waveform of each section, and
determine a plurality of bin numbers within a range between the minimum value and the maximum value.

11. The computing device of claim 8, wherein the processing element is further configured to
determine a lower boundary value and an upper boundary value for each bin;
determine a plurality of lower boundary times for each section, each bin having one or more lower boundary times, the one or more lower boundary times being the one or more times at which the waveform in the section has a y value equal to the lower boundary value of the associated bin, and
determine a plurality of upper boundary times for each section, each bin having one or more upper boundary times, the one or more upper boundary times being the one or more times at which the waveform in the section has a y value equal to the upper boundary value of the associated bin.

12. The computing device of claim 11, wherein
determining the lower boundary times includes omitting any times the waveform in the section has a y value equal to the lower boundary value of the associated bin that are less than the start time or greater than the stop time, and
determining the upper boundary times includes omitting any times the waveform in the section has a y value equal to the upper boundary value of the associated bin that are less than the start time or greater than the stop time.

13. The computing device of claim 11, wherein the processing element is further configured to
divide each section into a plurality of subsections, each subsection being defined by a slope of the waveform of the section,
associate each lower boundary time for each bin for each section with one of the subsections,
associate each upper boundary time for each bin for each section with one of the subsections, and
determine a plurality of subsection bin times, each subsection bin time equaling a magnitude of a difference of the upper boundary time and the lower boundary time associated with each subsection for each bin.

14. The computing device of claim 8, wherein the processing element is further configured to determine each section bin time as a sum of the subsection bin times for each bin in the associated section.

15. A non-transitory computer-readable storage medium with an executable program stored thereon for generating histogram data for a plurality of sampled data points, wherein the program instructs a processing element to perform the following:
- receiving a plurality of sampled data points, each data point including a y value and a t value;
- defining a plurality of bins, each bin having a unique number and representing a range of y values that the sampled data points could have;
- defining an array of elements, each element associated with a successive one of the bins and including histogram data for the associated range of y values;
- dividing the sampled data points into a plurality of sections, each section including a start time and a stop time;
- assigning a plurality of polynomial equations, one polynomial equation to each section, each polynomial equation having a waveform that fits the data points of the associated section;
- determining a plurality of section bin times, one section bin time for each bin in each section, each section bin time determined using the polynomial equation and indicating an amount of time that the waveform has values in the range of one of the bins; and
- adding the section bin time for each bin in each section to the histogram data in the array element pointed to by the number of the bin.

16. The non-transitory computer-readable storage medium of claim 15, wherein the program further instructs the processing element to determine a lower boundary value and an upper boundary value for each bin.

17. The non-transitory computer-readable storage medium of claim 15, wherein the program further instructs the processing element to
- determine a minimum value and a maximum value of the waveform of each section, and
- determine a plurality of bin numbers within a range between the minimum value and the maximum value.

18. The non-transitory computer-readable storage medium of claim 15, wherein the program further instructs the processing element to
- determine a lower boundary value and an upper boundary value for each bin;
- determine a plurality of lower boundary times for each section, each bin having one or more lower boundary times, the one or more lower boundary times being the one or more times at which the waveform in the section has a y value equal to the lower boundary value of the associated bin,
- omit any lower boundary times the waveform in the section has a y value equal to the lower boundary value of the associated bin that are less than the start time or greater than the stop time,
- determine a plurality of upper boundary times for each section, each bin having one or more upper boundary times, the one or more upper boundary times being the one or more times at which the waveform in the section has a y value equal to the upper boundary value of the associated bin, and
- omit any upper boundary times the waveform in the section has a y value equal to the upper boundary value of the associated bin that are less than the start time or greater than the stop time.

19. The non-transitory computer-readable storage medium of claim 18, wherein the program further instructs the processing element to
- divide each section into a plurality of subsections, each subsection being defined by a slope of the waveform of the section,
- associate each lower boundary time for each bin for each section with one of the subsections,
- associate each upper boundary time for each bin for each section with one of the subsections, and
- determine a plurality of subsection bin times, each subsection bin time equaling a magnitude of a difference of the upper boundary time and the lower boundary time associated with each subsection for each bin.

20. The non-transitory computer-readable storage medium of claim 15, wherein the program further instructs the processing element to determine each section bin time as a sum of the subsection bin times for each bin in the associated section.

* * * * *